(12) United States Patent
Chiba

(10) Patent No.: US 12,066,540 B2
(45) Date of Patent: Aug. 20, 2024

(54) AXIAL DEVIATION ESTIMATION APPARATUS

(71) Applicant: HONDA MOTOR CO., LTD., Tokyo (JP)

(72) Inventor: Motoki Chiba, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 239 days.

(21) Appl. No.: 17/679,741

(22) Filed: Feb. 24, 2022

(65) Prior Publication Data

US 2022/0308225 A1 Sep. 29, 2022

(30) Foreign Application Priority Data

Mar. 26, 2021 (JP) .................. 2021-053743

(51) Int. Cl.
*G01S 17/89* (2020.01)
*B60W 50/00* (2006.01)
(Continued)

(52) U.S. Cl.
CPC ......... *G01S 17/89* (2013.01); *B60W 50/0098* (2013.01); *G01S 7/4808* (2013.01);
(Continued)

(58) Field of Classification Search
CPC .......... G01S 17/89; G01S 17/32; G01S 17/86; G01S 17/931; G01S 17/40; G01S 7/4808; G01S 7/4817; G01S 7/4802; G01S 7/497; G01S 7/40; G01S 7/4972; G01S 13/931; B60W 50/0098; B60W 2552/15; B60W 2420/52; B60W 40/06; G06V 20/588;
(Continued)

(56) References Cited

U.S. PATENT DOCUMENTS 5,983,161 A * 11/1999 Lemelson ............... G01S 19/11
340/436
6,246,949 B1 * 6/2001 Shirai ................... G01S 17/931
701/96

(Continued)

FOREIGN PATENT DOCUMENTS

JP 2003-307561 A 10/2003
JP 2004-198159 A 7/2004

(Continued)

OTHER PUBLICATIONS

May 18, 2024, Translation of Chinese Office Action issued for related CN Application No. 202210183598.7.

*Primary Examiner* — Timothy R Newlin

(74) *Attorney, Agent, or Firm* — Paratus Law Group, PLLC

(57) ABSTRACT

An axial deviation estimation apparatus of an in-vehicle sensor includes a road surface recognition unit configured to recognize a road surface by a laser radar installed in a vehicle, an estimation unit configured to estimate an axial deviation amount of the in-vehicle sensor mounted on the vehicle, and a plane creation unit configured to create a virtual plane of the road surface based on a recognition result of the road surface recognition unit. The estimation unit estimates the axial deviation amount based on an inclination of the virtual plane with respect to a reference plane of the laser radar.

12 Claims, 13 Drawing Sheets

(51) Int. Cl.
  *G01S 7/48*     (2006.01)
  *G01S 7/481*    (2006.01)
  *G01S 17/32*    (2020.01)
  *G01S 17/86*    (2020.01)
  *G06V 20/56*    (2022.01)

(52) U.S. Cl.
  CPC .......... *G01S 7/4817* (2013.01); *G01S 17/32* (2013.01); *G01S 17/86* (2020.01); *G06V 20/588* (2022.01); *B60W 2552/15* (2020.02)

(58) Field of Classification Search
  CPC . G06T 2207/10028; G06T 2207/30244; G06T 2207/30256; G06T 7/73; G06T 7/80; G01B 11/02
  See application file for complete search history.

(56) References Cited

U.S. PATENT DOCUMENTS

| | | | | |
|---|---|---|---|---|
| 6,813,370 | B1* | 11/2004 | Arai | G06V 10/457 340/919 |
| 7,304,602 | B2* | 12/2007 | Shinagawa | G01S 7/4026 342/146 |
| 10,254,767 | B1* | 4/2019 | Kamon | G05D 1/102 |
| 2005/0285778 | A1* | 12/2005 | Shinagawa | G01S 7/4026 342/146 |
| 2010/0165102 | A1* | 7/2010 | Klebanov | G06T 7/70 348/135 |
| 2012/0007985 | A1* | 1/2012 | Inui | H04N 17/002 348/148 |
| 2012/0263383 | A1* | 10/2012 | Otuka | G06V 20/588 382/195 |
| 2013/0030685 | A1* | 1/2013 | Goetting | G01S 7/497 701/301 |
| 2014/0340518 | A1* | 11/2014 | Kambe | G06F 18/251 348/148 |
| 2014/0347206 | A1* | 11/2014 | Steinlechner | G01S 7/40 342/5 |
| 2015/0161456 | A1* | 6/2015 | Chevalley | H04N 23/683 348/148 |
| 2017/0315207 | A1* | 11/2017 | Baba | G01S 13/867 |
| 2017/0336515 | A1* | 11/2017 | Hosoya | G01C 21/28 |
| 2019/0071188 | A1* | 3/2019 | Adarve Lozano | B64D 39/06 |
| 2019/0101621 | A1* | 4/2019 | Machida | G01S 13/931 |
| 2019/0101649 | A1* | 4/2019 | Jensen | G05D 1/0274 |
| 2020/0041650 | A1* | 2/2020 | Matsui | G01S 7/4817 |
| 2020/0156645 | A1* | 5/2020 | Niioka | B60W 10/04 |
| 2020/0284889 | A1* | 9/2020 | Araki | G01B 11/272 |
| 2020/0307685 | A1* | 10/2020 | Akiyama | B62D 15/0215 |
| 2021/0004567 | A1* | 1/2021 | Hwangbo | G01S 17/08 |
| 2021/0101747 | A1* | 4/2021 | Ishigami | G06T 7/579 |
| 2021/0364280 | A1* | 11/2021 | Miki | G01S 17/04 |
| 2021/0389469 | A1* | 12/2021 | Sakata | B60W 40/08 |
| 2022/0126836 | A1* | 4/2022 | Machii | G06V 20/588 |
| 2022/0187421 | A1* | 6/2022 | Cole | G01S 7/4034 |
| 2022/0228862 | A1* | 7/2022 | Kondo | G01S 7/4091 |
| 2022/0244392 | A1* | 8/2022 | Cronin | G01S 17/89 |
| 2022/0281476 | A1* | 9/2022 | Aoki | B60W 40/12 |
| 2023/0008630 | A1* | 1/2023 | Kondo | G01S 7/4091 |
| 2023/0017336 | A1* | 1/2023 | He | G01S 13/865 |
| 2023/0044311 | A1* | 2/2023 | Matsuo | G06V 20/588 |
| 2023/0136329 | A1* | 5/2023 | Ahmadzadeh | G06V 20/17 702/152 |
| 2023/0176186 | A1* | 6/2023 | Kondo | G01S 7/403 342/70 |

FOREIGN PATENT DOCUMENTS

| | | |
|---|---|---|
| JP | 2007-248056 A | 9/2007 |
| JP | 2014-228943 A | 12/2014 |
| JP | 2015-075382 A | 4/2015 |
| JP | 2020-134367 A | 8/2020 |
| JP | 2020-143969 A | 9/2020 |
| WO | WO 2020/121838 A1 | 6/2020 |

* cited by examiner

FIG.13
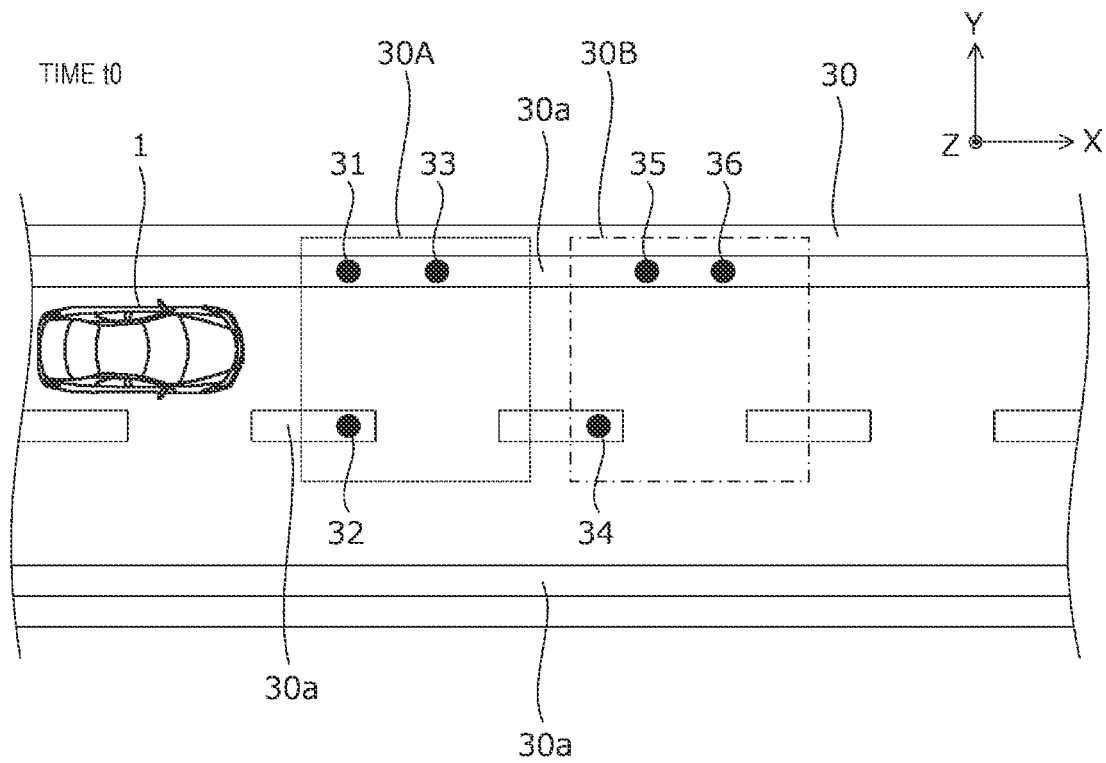
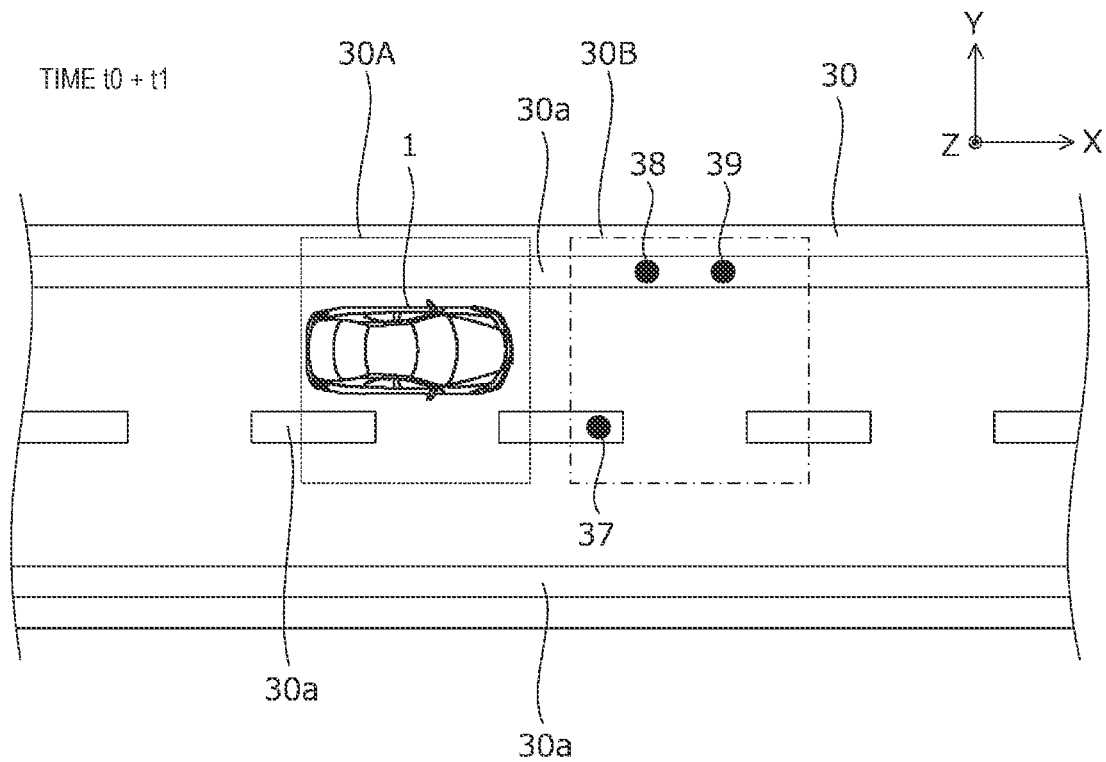

AXIAL DEVIATION ESTIMATION APPARATUS

CROSS-REFERENCE TO RELATED APPLICATION

The present application claims priority from Japanese Patent Application No. 2021-053743 filed on Mar. 26, 2021, the entire content of which is incorporated herein by reference.

TECHNICAL FIELD

The present invention relates to an axial deviation estimation apparatus.

BACKGROUND ART

In the related art, a technique for detecting an axial deviation of an in-vehicle sensor based on a detection result of a lane (white lines) in which a vehicle travels is known.

JP-A-2003-307561 discloses a vehicle driving assistance apparatus that recognizes left and right lanes on a road from an image in a vehicle traveling direction captured by an in-vehicle camera, that estimates a posture angle of the vehicle based on a change in a horizontal line position in an image plane using an intersection of approximate straight lines in a captured image plane of the left and right lanes as the horizontal line position in the image plane, and that controls an actuator for adjusting a beam radiation angle of an in-vehicle radar in an upper-lower direction based on the posture angle in the vehicle driving assistance apparatus that recognizes an outside-vehicle environment by using the in-vehicle radar and an image captured by the in-vehicle camera in combination, and that assists a driving operation of a driver.

JP-A-2004-198159 discloses an in-vehicle sensor axial deviation measurement apparatus that includes a position measurement device which is mounted on a vehicle and which measures a position of a front object present in front of the vehicle, that captures an image in the same direction, and that calculates a movement vector of a stationary object based on object position data and that measures an axial deviation of the position measurement device based on the movement vector when it is determined that the vehicle is in a straight traveling state by detecting white lines based on image data.

JP-A-2014-228943 discloses a vehicle external environment sensing apparatus that corrects a deviation angle between an axial direction of an in-vehicle camera and an obstacle detection sensor mounted on a vehicle on the same axis and a traveling direction of the vehicle, the vehicle external environment sensing apparatus recognizing at least two lanes drawn on a road and determining whether the vehicle is traveling straight based on a captured image in which a traveling direction of the vehicle is captured by the in-vehicle camera, calculating the deviation angle based on the recognized at least two lanes when the vehicle is traveling straight, and correcting a position of an obstacle recognized from the captured image and a position of the obstacle detected by the obstacle detection sensor with the calculated deviation angle.

JP-A-2020-143969 discloses a vehicle-mounted LIDAR axial deviation detection apparatus that detects an axial deviation of a LIDAR mounted on a vehicle, in which when a first white line is detected based on image-capturing information acquired by a camera disposed inside a vehicle interior of the vehicle, a second white line is detected based on point information acquired by the LIDAR disposed outside the vehicle interior of the vehicle and an axial deviation angle of the LIDAR with respect to the camera is estimated, in a case where a comparison result between a detection result of the first white line and a detection result after rotation obtained by rotating a detection result of the second white line at a predetermined angle around an attachment position of the LIDAR with respect to the vehicle satisfies a predetermined condition, the predetermined angle is estimated to be the axial deviation angle of the LIDAR with respect to the camera.

In the technique in the related art in which the axial deviation of the in-vehicle sensor is detected based on a detection result of the white lines (lane), it is not possible to accurately estimate the axial deviation of the in-vehicle sensor when one of the left and right white lines cannot be detected, when the detected white line is not a straight line, when the vehicle does not travel straight, or the like.

SUMMARY

An object of the present invention is to provide an axial deviation estimation apparatus that can accurately estimate an axial deviation of an in-vehicle sensor.

The present invention provides an axial deviation estimation apparatus of an in-vehicle sensor including a road surface recognition unit configured to recognize a road surface by a laser radar installed in a vehicle, an estimation unit configured to estimate an axial deviation amount of the in-vehicle sensor mounted on the vehicle, and a plane creation unit configured to create a virtual plane of the road surface based on a recognition result of the road surface recognition unit. The estimation unit estimates the axial deviation amount based on an inclination of the virtual plane with respect to a reference plane of the laser radar.

According to the axial deviation estimation apparatus of the present invention, it is possible to accurately estimate the axial deviation of the in-vehicle sensor.

BRIEF DESCRIPTION OF DRAWINGS

FIG. 13 is a diagram showing an example of estimation of an axial deviation amount based on a plurality of virtual planes performed by the axial deviation estimation unit 55.

DESCRIPTION OF EMBODIMENTS

Hereinafter, an embodiment of an axial deviation estimation apparatus of the present invention will be described with reference to the drawings. Hereinafter, for convenience of description, a center of a vehicle body is defined as an origin, a front-rear (vehicle length) direction is defined as an X axis, a left-right (vehicle width) direction is defined as a Y axis, and an upper-lower direction is defined as a Z axis. Further, an X-axis direction or a Y-axis direction is appropriately referred to as a horizontal axis direction, and a Z-axis direction is appropriately referred to as a vertical axis direction.

A rotation direction with the X axis as an axis corresponds to a roll direction, a rotation direction with the Y axis as an axis corresponds to a pitch direction, and a rotation direction with the Z axis as an axis corresponds to a yaw direction, and the X axis corresponds to a roll axis, the Y axis corresponds to a pitch axis, and the Z axis corresponds to a yaw axis.

<Vehicle 1 to which Axial Deviation Estimation Apparatus of the Present Invention is Applied>

Figure 1:
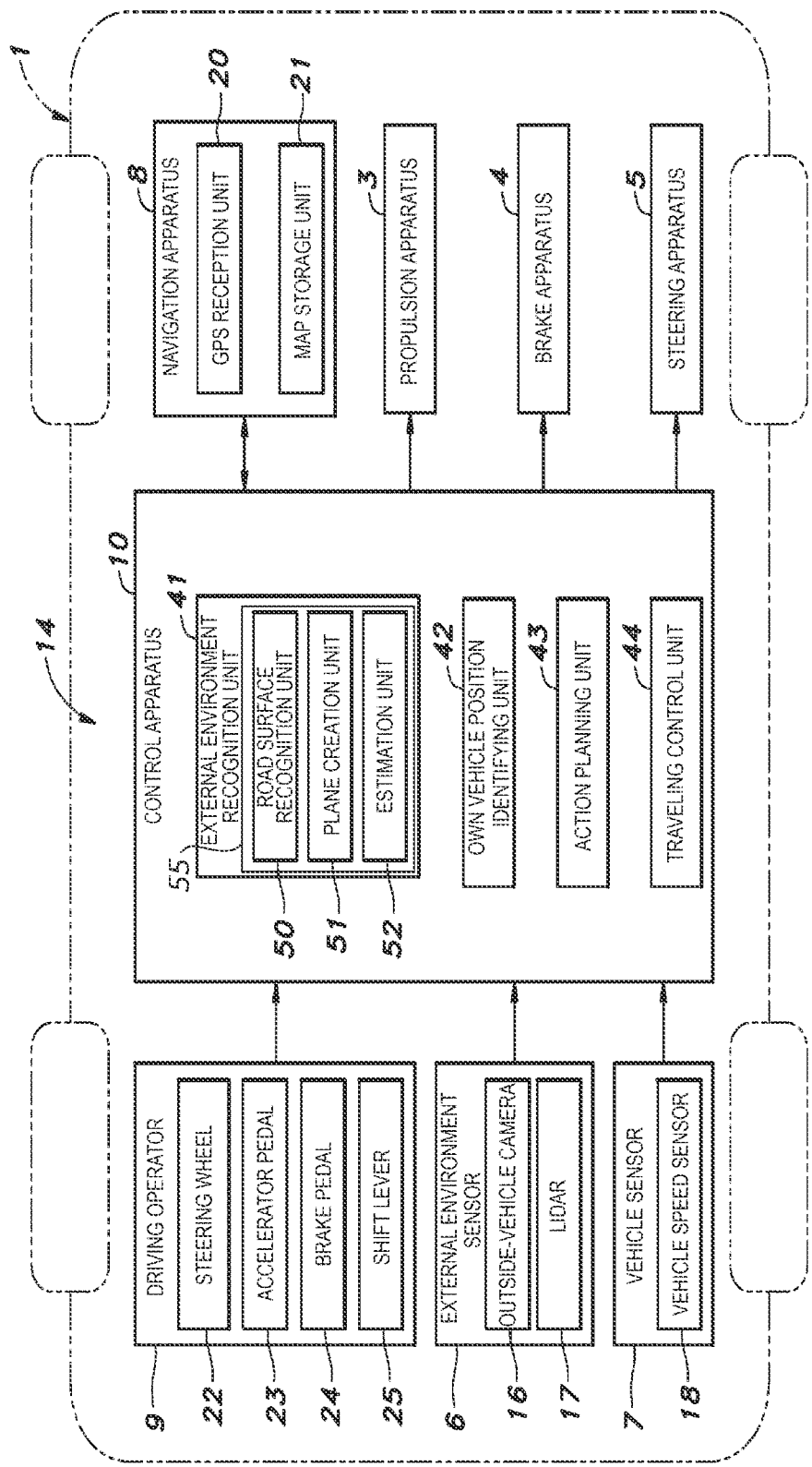
FIG. 1 is a diagram showing an example of a vehicle 1 to which an axial deviation estimation apparatus of the present invention is applied.
Figure 2:
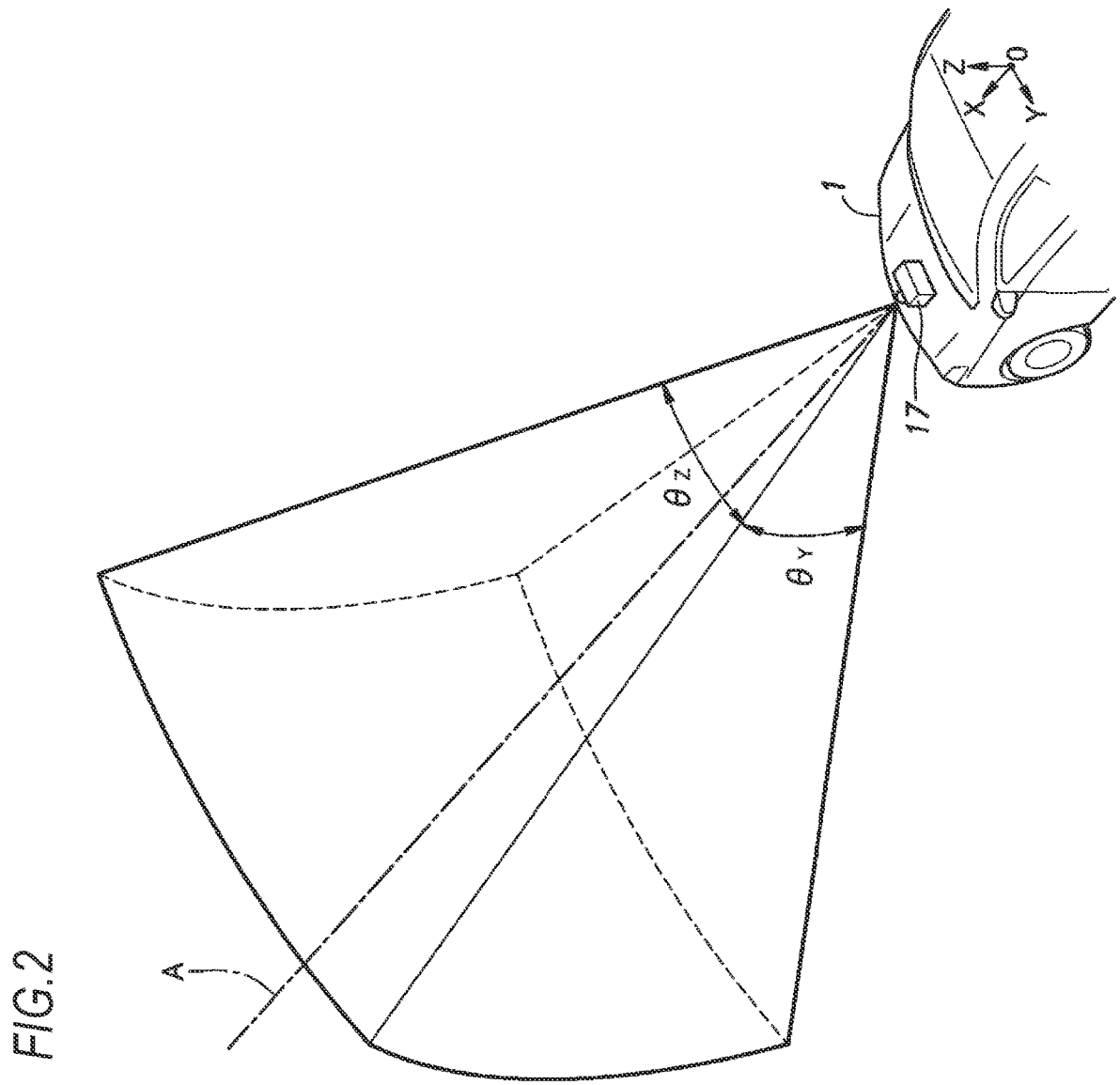
FIG. 2 is a diagram showing an example of a scanning range of a LIDAR shown in FIG. 1.

FIG. 1 is a diagram showing an example of a vehicle 1 to which an axial deviation estimation apparatus of the present invention is applied. FIG. 2 is a diagram showing an example of a scanning range of a millimeter-wave radar. As shown in FIG. 1, the vehicle 1 includes a vehicle control system 14 including a propulsion apparatus 3, a brake apparatus 4, a, steering apparatus 5, an external environment sensor 6, a vehicle sensor 7, a navigation apparatus 8, a driving operator 9, and a control apparatus 10. Components of the vehicle control system 14 are connected to each other by a communication unit such as a controller area network (CAN) so as to be able to transmit signals.

The propulsion apparatus 3 is an apparatus that applies a driving force to the vehicle 1, and includes, tier example, a power source and a transmission. The power source includes at least one of an internal combustion engine such as a gasoline engine or a diesel engine and an electric motor. In the present embodiment, the propulsion apparatus 3 includes an automatic transmission and a shift actuator that changes a shift position of the automatic transmission. The brake apparatus 4 is an apparatus that applies a braking force to the vehicle 1, and includes, for example, a brake caliper that presses a pad against a brake rotor, and an electric cylinder that supplies a hydraulic pressure to the brake caliper. The brake apparatus 4 may include an electric parking brake apparatus that restricts rotation of wheels by a wire cable. The steering apparatus 5 is an apparatus for changing a steering angle of the wheels, and includes, for example, a rack-and-pinion mechanism that steers the wheels, and an electric motor that drives the rack-and-pinion mechanism. The propulsion apparatus 3, the brake apparatus 4, and the steering apparatus 5 are controlled by the control apparatus 10.

The external environment sensor 6 is an apparatus (external environment acquisition apparatus) that captures an electromagnetic wave, a sound wave, or the like from a periphery of the vehicle 1, detects an object or the like outside the vehicle, and acquires information on the periphery of the vehicle 1. The external environment sensor 6 includes an outside-vehicle camera 16 and a LIDAR 17.

The outside-vehicle camera 16 is, for example, a digital camera that uses a solid-state image-capturing element such as a CCD or a CMOS, and the outside-vehicle camera 16 is attached to the vehicle 1 (more specifically, a rear-view mirror) such that an optical axis is in a front direction of the vehicle 1, that is, in front of the vehicle 1, and captures an image of a front side (x-axis direction) of the vehicle 1.

The LIDAR 17 is a laser imaging detection and ranging (LIDAR), and is an example of a laser radar installed in the vehicle 1. Further, the LIDAR 17 is an example of an in-vehicle sensor that is an estimation target of an axial deviation. As shown in FIG. 2, the LIDAR 17 receives a reflected wave from a surrounding object while transmitting an electromagnetic wave (transmission wave) toward an outside of the vehicle around an optical axis A, and scans surroundings of the vehicle 1. Accordingly, the LIDAR 17 acquires distance measurement data and detects a position of an object around the vehicle 1. The distance measurement data includes a direction in which the object is present as viewed from the LIDAR 17 and a distance between the LIDAR 17 and the object. The electromagnetic wave transmitted from the LIDAR 17 may be an electromagnetic wave having any wavelength such as ultraviolet light, visible light, or near-infrared light.

The LIDAR 17 is attached to a predetermined position on a front portion of the vehicle 1. At the time of mounting on the vehicle 1 (at the time of factory shipment), the optical axis A of the LIDAR 17 is set to a front side, and a scanning range thereof is set to be within a predetermined angle θz around the Z axis (yaw axis) and within a predetermined angle θy around the Y axis (pitch axis) with the optical axis A as a center.

The vehicle sensor 7 includes a vehicle speed sensor 18 that detects a speed of the vehicle 1. The vehicle sensor 7 may include, in addition to the vehicle speed sensor 18, an acceleration sensor that detects acceleration of the vehicle 1, a yaw rate sensor that detects an angular velocity around a vertical axis (Z axis) of the vehicle 1, an orientation sensor that detects a direction of the vehicle 1, and the like.

The navigation apparatus 8 is an apparatus that acquires a current position of the vehicle 1 and performs route guidance to a destination and the like, and includes a GPS reception unit 20 and a map storage unit 21. The GPS reception unit 20 identifies a position (latitude and longitude) of the vehicle 1 based on a signal received from an artificial satellite (positioning satellite). The map storage unit 21 is configured with a known storage apparatus such as a flash memory or a hard disk, and stores map information.

The driving operator 9 is provided in a vehicle interior, and receives an input operation performed by a user to control the vehicle 1. The driving operator 9 includes a steering wheel 22, an accelerator pedal 23, a brake pedal 24 (braking operator), and a shift lever 25.

The control apparatus 10 is an electronic control unit (ECU) including a processor such as a CPU, a nonvolatile memory (ROM), a volatile memory (RAM), and the like. The control apparatus 10 executes various vehicle controls by executing an arithmetic processing in accordance with a program by a processor. Further, a processing serving as the axial deviation estimation apparatus of the present invention is executed by the processor of the control apparatus 10. The control apparatus 10 may be configured as one piece of hardware, or may be configured as a unit including a plurality of pieces of hardware. Further, at least some functional units of the control apparatus 10 may be implemented by hardware such as an LSI, an ASIC, or an FPGA, or may be implemented by a combination of software and hardware.

The control apparatus 10 controls the propulsion apparatus 3, the brake apparatus 4, and the steering apparatus 5 so as to avoid at least an object present around the vehicle 1 based on an image acquired by the outside-vehicle camera 16 or distance measurement data acquired by the LIDAR 17. For example, the control apparatus 10 can control the vehicle 1 by performing an assistance processing of performing driving assistance of a driver or an autonomous traveling processing of causing the vehicle 1 to autonomously travel while avoiding the object present around the vehicle 1.

In order to perform such control of the vehicle 1, the control apparatus 10 includes an external environment recognition unit 41, an own vehicle position identifying unit 42, an action planning unit 43, and a traveling control unit 44.

The external environment recognition unit 41 appropriately controls the external environment sensor 6 and acquires a detection result from the external environment sensor 6. The external environment recognition unit 41 recognizes, for example, a target such as a pedestrian present around the vehicle 1 or the vehicle 1 based on the detection result of the external environment sensor 6. The external environment recognition unit 41 acquires a position of the target with respect to the vehicle 1 based on the distance measurement data acquired by the LIDAR 17. Further, the external environment recognition unit 41 acquires a size of the target based on the detection result of the external environment sensor 6 including the image acquired by the outside-vehicle camera 16, the distance measurement data acquired by the LIDAR 17, and the like, and determines a type of the target (for example, the target is a pylon, a street lamp, or the like) based on the detection result of the external environment sensor 6 by using a known method such as machine learning.

The own vehicle position identifying unit 42 detects a position of the vehicle 1 based on a signal from the GPS reception unit 20 of the navigation apparatus 8. Further, in addition to the signal from the GPS reception unit 20, the own vehicle position identifying unit 42 may acquire a vehicle speed and a yaw rate from the vehicle sensor 7, and identify a position and a posture of the vehicle 1 by using so-called inertial navigation.

The traveling control unit 44 controls the propulsion apparatus 3, the brake apparatus 4, and the steering apparatus 5 in accordance with a traveling control instruction from the action planning unit 43 and causes the vehicle 1 to travel. More specifically, when a trajectory along which the vehicle 1 should travel is instructed from the action planning unit 43, the traveling control unit 44 causes the vehicle 1 to travel along the trajectory as much as possible while controlling the propulsion apparatus 3, the brake apparatus 4, and the steering apparatus 5 so as to avoid the target based on a position or a size of the target positioned around the vehicle 1 acquired by the external environment recognition unit 41.

The action planning unit 43 executes a following traveling processing of following a vehicle that travels ahead or a retreat processing of safely stopping the vehicle 1 (a processing for performing a so-called minimum risk maneuver (MRM)) when the driver cannot take over a driving operation at the time of switching driving from automatic driving to manual driving. The action planning unit 43 calculates a trajectory along which the vehicle 1 should travel in each processing, and outputs an instruction to the traveling control unit 44 to cause the vehicle 1 to travel along the trajectory.

However, after traveling of the vehicle 1 is started, the action planning unit 43 appropriately instructs the external environment recognition unit 41 to estimate axial deviation of the LIDAR 17, except for a case where a processing such as the following traveling processing, or the retreat processing is preferably performed. In the axial deviation estimation, the external environment recognition unit 41 acquires an axial deviation amount of the LIDAR 17, and outputs a restriction signal to the action planning unit 43 when it is determined that there is an axial deviation for which a processing executable by the action planning unit 43 is to be restricted.

When the restriction signal is input, the action planning unit 43 restricts the executable processing. For example, when the restriction signal is input, the action planning unit 43 prohibits execution of the following traveling processing, but enables execution of the retreat processing. In contrast, when the restriction signal is not input, the action planning unit 43 can execute the following traveling processing and the retreat processing.

The external environment recognition unit 41 includes an axial deviation estimation unit 55 that performs the axial deviation estimation of the LIDAR 17. The axial deviation estimation unit 55 is an example of the axial deviation estimation apparatus of the present invention, and includes a road surface recognition unit 50, a plane creation unit 51, and an estimation unit 52. The road surface recognition unit 50 recognizes a road surface on which the vehicle 1 travels based on the distance measurement data acquired by the LIDAR 17.

The plane creation unit 51 creates a virtual plane of the road surface based on a recognition result of the road surface recognition unit 50. The virtual plane of the road surface is a plane in a three-dimensional external space recognized by the external environment recognition unit 41, a position and a direction of which substantially coincide with those of the road surface.

The estimation unit 52 estimates the axial deviation amount of the LIDAR 17 based on an inclination of the virtual plane created by the plane creation unit 51 with respect to a reference plane of the LIDAR 17. The reference plane of the LIDAR 17 is a reference plane of distance measurement of the LIDAR 17. The LIDAR 17 is installed in the vehicle 1 such that the reference plane is in a predetermined direction (for example, a horizontal direction).

The estimation unit 52 acquires the axial deviation amount of the LIDAR 17 by the above-described axial deviation estimation, and outputs, to the action planning unit 43, a restriction signal indicating that there is an axial deviation to an extent that the processing executable by the action planning unit 43 should be restricted.

Next, an operation of the vehicle 1 configured as described above will be described. When the vehicle 1 starts traveling or is during traveling, the action planning unit 43 appropriately instructs the external environment recognition unit 41 to start the axial deviation estimation of the LIDAR 17. The estimation unit 52 of the external environment recognition unit 41 receives the instruction, executes an axial deviation estimation processing, and outputs a restriction signal to the action planning unit 43 when it is estimated that there is a large axial deviation. In other words, the control apparatus 10 functions as the axial deviation estimation apparatus that performs the axial deviation estimation of the LIDAR 17 (in-vehicle sensor), and performs own vehicle control based on the estimation result.

<Processing Performed by Axial Deviation Estimation Unit 55>

Figure 3:
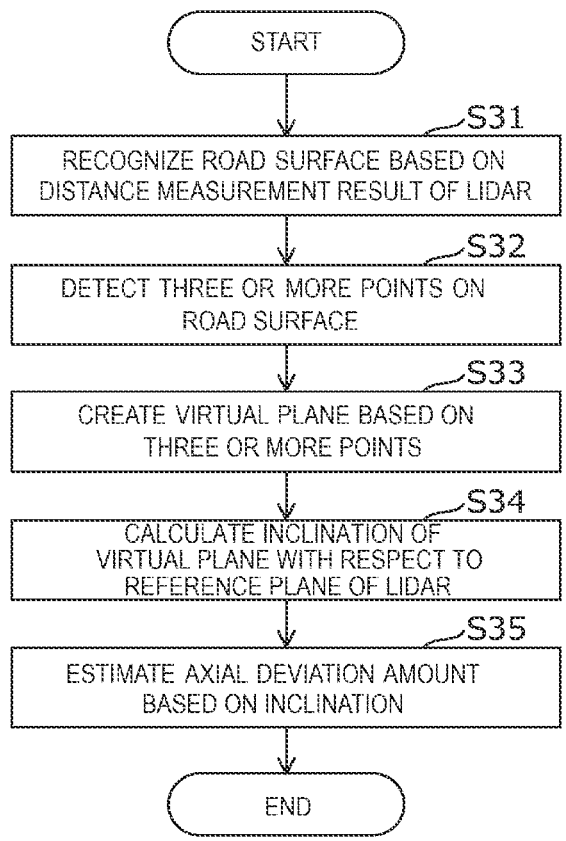
FIG. 3 is a flowchart showing an example of a processing performed by an axial deviation estimation unit 55.

FIG. 3 is a flowchart showing an example of a processing performed by the axial deviation estimation unit 55. The axial deviation estimation unit 55 of the control apparatus 10 executes, for example, the processing shown in FIG. 3. The processing shown in FIG. 3 may be performed, for example, at the time of starting an engine of the vehicle 1, or may be repeatedly performed while the vehicle 1 is traveling.

First, the axial deviation estimation unit 55 recognizes a road surface on which the vehicle 1 travels based on a distance measurement result of the LIDAR 17 by the road surface recognition unit 50 (step S31). Next, the axial deviation estimation unit 55 detects three or more points on the road surface recognized in step S31 by the plane creation unit 51 (step S32), Detection of the road surface on which the vehicle 1 travels and the three or more points on the road surface will be described later (see FIG. 4 and the like).

Next, the axial deviation estimation unit 55 creates a virtual plane based on the three or more points detected in step S32 by the plane creation unit 51 (step S33). Next, the axial deviation estimation unit 55 calculates an inclination of the virtual plane created in step S32 with respect to a reference plane of the LIDAR 17 (step S34). Next, the axial deviation estimation unit 55 estimates an axial deviation amount of the LIDAR 17 based on the inclination calculated in step S34 by the estimation unit 52 (step S35), and ends the series of processings. In step S35, the axial deviation estimation unit 55 may calculate an average (including a weighted average) of a plurality of axial deviation amounts including the axial deviation amount of the LIDAR 17 estimated based on the inclination calculated in step S34 this time and an axial deviation amount of the LIDAR 17 estimated based on an inclination calculated in step S34 in the past. The creation of the virtual plane and the estimation of the axial deviation amount based on the inclination will be described later (see FIGS. 5 to 9).

<Detection of Three Points on Road Surface Performed by Axial Deviation Estimation Unit 55>

Figure 4:
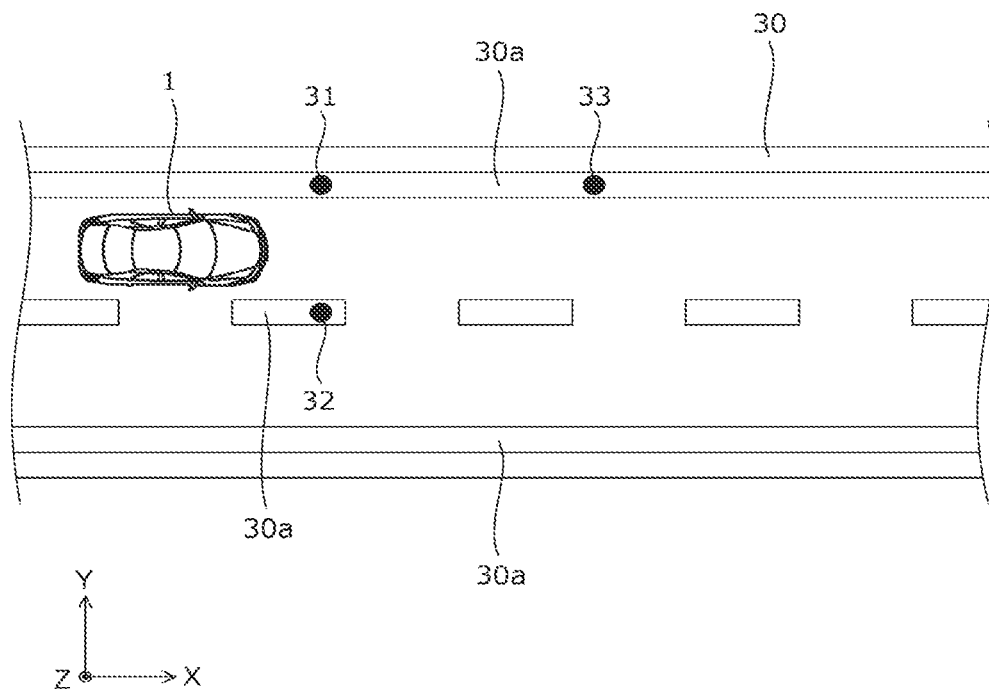
FIG. 4 is a diagram showing an example of detection of three points on a road surface performed by the axial deviation estimation unit 55.

FIG. 4 is a diagram showing an example of detection of three points on a road surface performed by the axial deviation estimation unit 55. A road surface 30 is a road surface of a road having two lanes on each side on which the vehicle 1 travels. Road signs 30a are white road signs such as lane marks, and are high luminance reflection hands having a high reflection intensity. Further, the road sign 30a is not limited to the white road sign, and may be a road sign of another color such as yellow or blue. The road surface recognition unit 50 of the axial deviation estimation unit 55 recognizes the road surface 30 based on a distance measurement result of the LIDAR 17.

The plane creation unit 51 of the axial deviation estimation unit 55 detects three or more points on the road surface 30 recognized by the road surface recognition unit 50. For example, the plane creation unit 51 detects three or more points at which a reflection intensity is equal to or larger than a predetermined value among points on the road surface 30 by using information of reflection intensity included in sensing data by the LIDAR 17. In the example of FIG. 4, points 31 to 33 of the road signs 30a that are high luminance reflection bands on the road surface 30 are detected.

Here, a case where a portion of the road surface 30 where the vehicle 1 is positioned and a portion of the road surface 30 including the points 31 to 33 are parallel to each other will be described.

<LIDAR 17 in State where No Axial Deviation Occurs>

Figure 5:
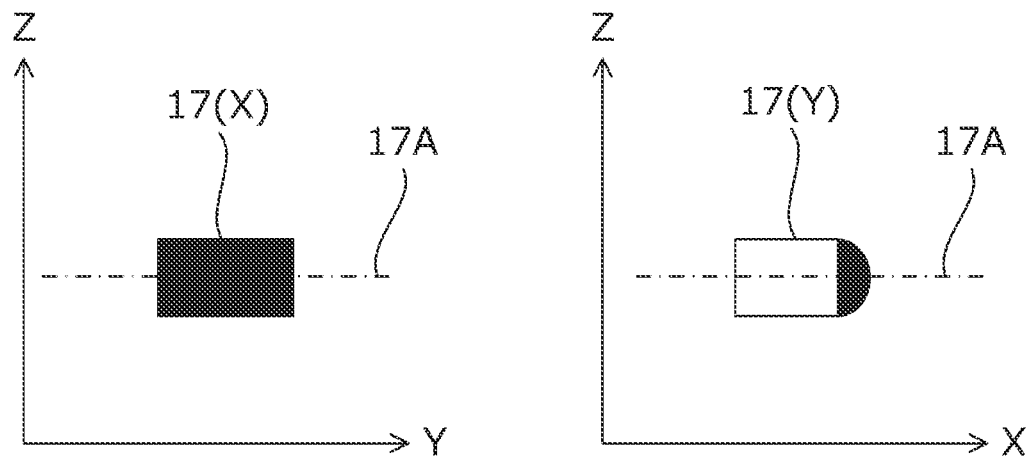
FIG. 5 is a diagram showing an example of a LIDAR 17 in a state where no axial deviation occurs.
Figure 6:
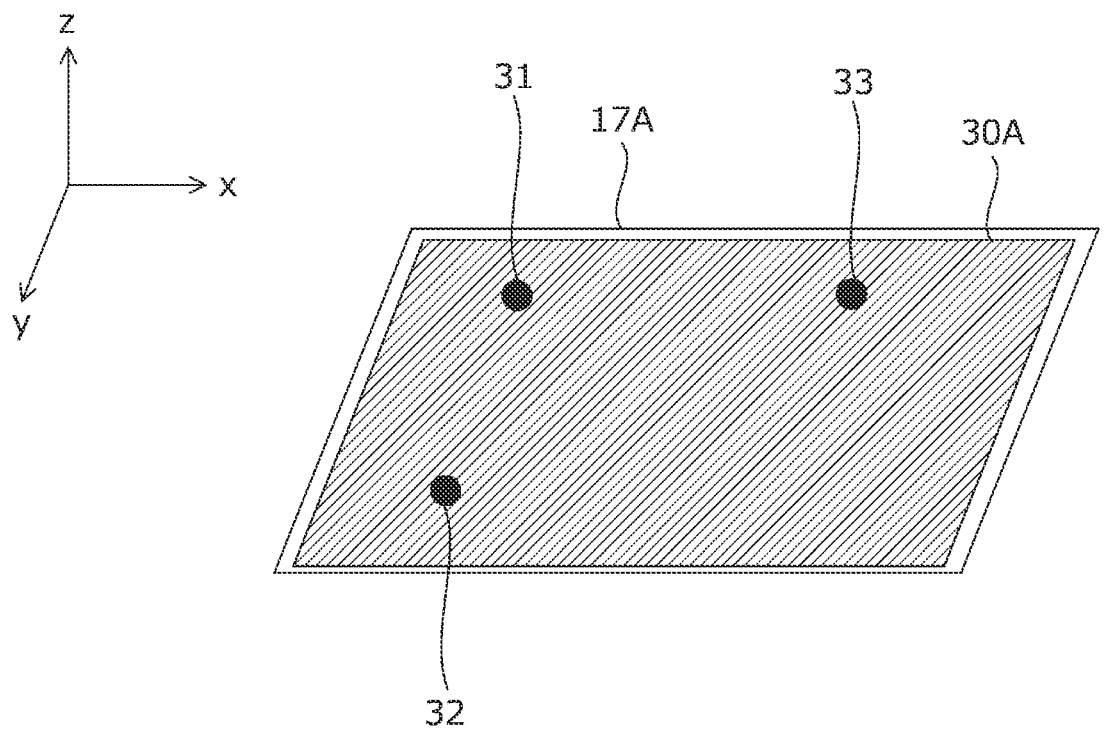
FIG. 6 is a diagram showing an example of creation of a virtual plane in the state where no axial deviation of the LIDAR 17 occurs.

FIG. 5 is a diagram showing an example of the LIDAR 17 in a state where no axial deviation occurs. FIG. 6 is a diagram showing an example of creation of a virtual plane in the state where no axial deviation of the LIDAR 17 occurs. A LIDAR 17(X) is the LIDAR 17 viewed from a front side (X-axis direction) of the vehicle 1. A LIDAR 17(Y) is the LIDAR 17 viewed from a side (Y-axis direction) of the vehicle 1. A reference plane 17A is a reference plane for distance measurement of the LIDAR 17 described above.

As shown in FIG. 5, the LIDAR 17 is installed in the vehicle 1 such that the reference plane 17A is parallel to a horizontal direction (XY plane) of the vehicle 1, that is, orthogonal to a vertical direction (Z-axis direction) of the vehicle 1, in the state where no axial deviation occurs.

A virtual plane 30A shown in FIG. 6 is a virtual plane of the road surface 30 created by the plane creation unit 51. The plane creation unit 51 creates the virtual plane 30A including the detected points 31 to 33. Here, a space recognized by the distance measurement data from the LIDAR 17 is defined as a xyz space including an x axis, a y axis, and a z axis. The virtual plane 30A is a xy plane including the x axis and the y axis.

As shown in FIG. 6, in the state where no axial deviation of the LIDAR 17 occurs, the virtual plane 30A coincides with the reference plane 17A.

<LIDAR 17 in State where Axial Deviation Occurs>

Figure 7:
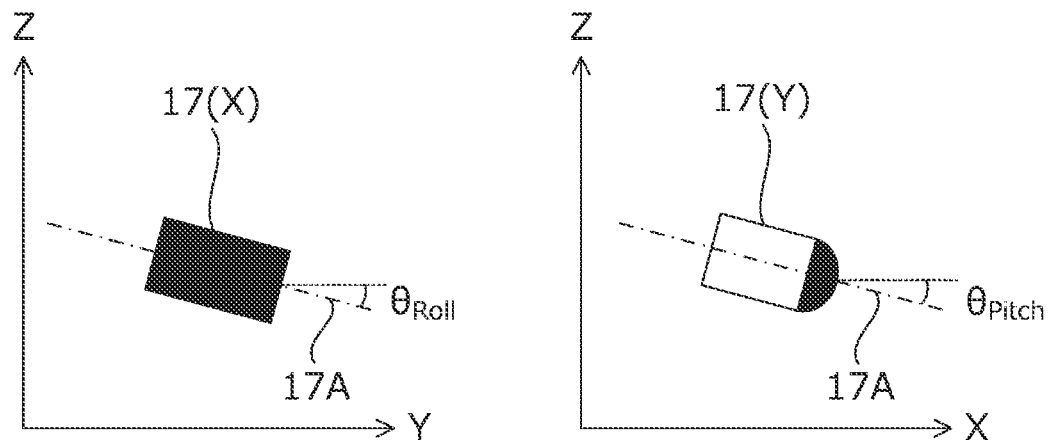
FIG. 7 is a diagram showing an example of the LIDAR 17 in a state where an axial deviation occurs.
Figure 8:
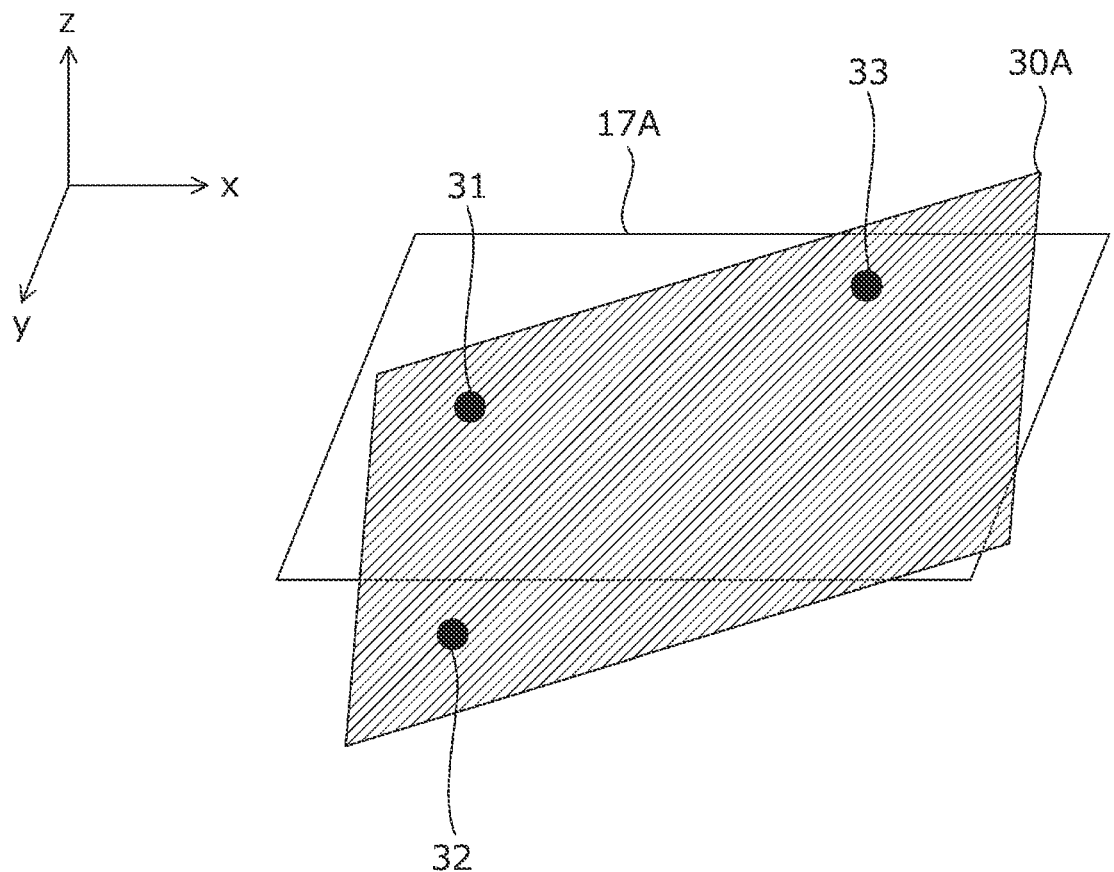
FIG. 8 is a diagram showing an example of creation of a virtual plane in the state where the axial deviation of the LIDAR 17 occurs.

FIG. 7 is a diagram showing an example of the LIDAR 17 in a state where an axial deviation occurs. FIG. 8 is a diagram showing an example of creation of a virtual plane in the state where the axial deviation of the LIDAR 17 occurs. In the example, an axial deviation in the roll direction and an axial deviation in the pitch direction occur in the LIDAR 17.

As shown in the LIDAR 17(X) of FIG. 7, when the axial deviation in the roll direction occurs in the LIDAR 17, the reference plane 17A is inclined with respect to the horizontal direction (XV plane) of the vehicle 1 in a YZ plane. An amount of the inclination in the YZ plane is referred to as an axial deviation amount $\theta_{Roll}$.

As shown in the LIDAR 17(Y) of FIG. 7, when the axial deviation in the pitch direction occurs in the LIDAR 17, the reference plane 17A is inclined with respect to the horizontal direction (XY plane) of the vehicle 1 in an XZ plane. An amount of the inclination in the XZ plane is referred to as an axial deviation amount $\theta_{Pitch}$.

As shown in FIG. 8, in the state where the axial deviation of the LIDAR 17 occurs, the virtual plane 30A including the points 31 to 33 is inclined with respect to the reference plane 17A.

<Estimation of Axial Deviation of LIDAR 17 Performed by Estimation Unit 52>

Figure 9:
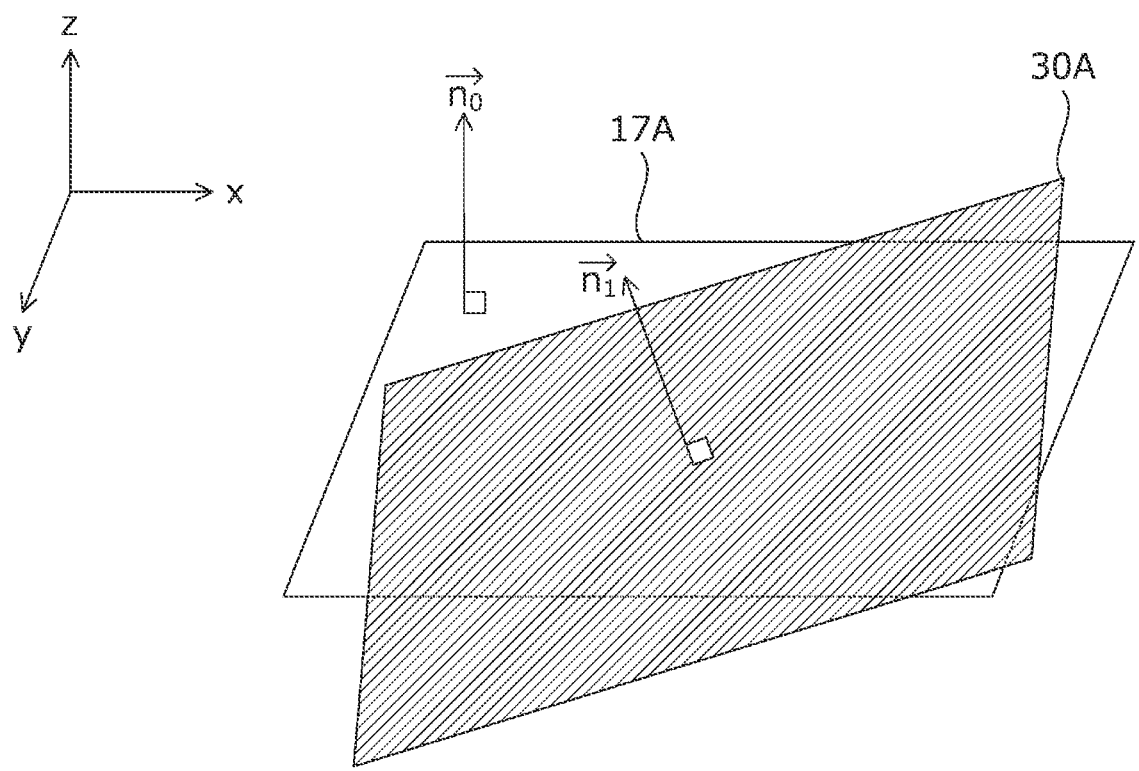
FIG. 9 is a diagram showing an example of estimation of the axial deviation of the LIDAR 17 performed by an estimation unit 52.

FIG. 9 is a diagram showing an example of estimation of the axial deviation of the LIDAR 17 performed by the estimation unit 52. In FIG. 9, an example in which the axial deviation in the roll direction and the axial deviation in the pitch direction occur in the LIDAR 17 as in the example of FIG. 8 will be described.

The virtual plane 30A in the xyz space can be expressed as, for example, ax+by+cz+d=0. That is, the creation of the virtual plane 30A by the plane creation unit 51 is to calculate coefficients a, b, c, and d such that the virtual plane 30A represented by ax+by+cz+d=0 passes through the three points 31 to 33.

A vector n0 orthogonal to the reference plane 17A can be expressed by the following Equation (1). A vector n1 orthogonal to the virtual plane 30A can be expressed by the following Equation (2).

$$\vec{n_0} = (0,0,1) \quad (1)$$

$$\vec{n_1} = (a,b,c) \quad (2)$$

The vectors of Equation (1) and Equation (2) are decomposed into the yz plane and the xz plane. The vector n0 shown in Equation (1) can be expressed as a vector $n_{yz0}$ of the following Equation (3) in the yz plane. The vector n1 shown in Equation (2) can be expressed as a vector $n_{yz1}$ of the following Equation (4) in the yz plane. The vector n0 shown in Equation (1) can be expressed as a vector $n_{xz0}$ of the following Equation (5) in the xz plane. The vector n1 shown in Equation (2) can be expressed as a vector $n_{xz1}$ of the following Equation (6) in the xz plane.

$$\vec{n_{yz0}} = (0,1) \quad (3)$$

$$\vec{n_{yz1}} = (b,c) \quad (4)$$

$$\vec{n_{xz0}} = (0,1) \quad (5)$$

$$\vec{n_{xz1}} = (a,c) \quad (6)$$

The axial deviation amount $\theta_{Roll}$ in the roll direction can be calculated as the following Equation (7) by using an inner product of the vector $n_{yz0}$ shown in Equation (3) and the vector $n_{yz1}$ shown in Equation (4). The axial deviation amount $\theta_{Pitch}$ in the pitch direction can be calculated as the following Equation (8) by using an inner product of the vector $n_{xz0}$ shown in Equation (5) and the vector $n_{xz1}$ shown in Equation (6).

$$\theta_{Roll} = \arccos\left(\frac{c}{\sqrt{b^2 + c^2}}\right) \quad (7)$$

$$\theta_{Pitch} = \arccos\left(\frac{c}{\sqrt{a^2 + c^2}}\right) \quad (8)$$

The estimation unit 52 calculates at least one of the above-described axial deviation amounts $\theta_{Roll}$ and $\theta_{Pitch}$ as an estimated value of the axial deviation amount of the LIDAR 17. Alternatively, the estimation unit 52 may calculate a sum or an average of the above-described axial deviation amounts $\theta_{Roll}$ and $\theta_{Pitch}$ as the estimated value of the axial deviation amount of the LIDAR 17.

As described above, the axial deviation estimation unit 55 recognizes the road surface 30 by the LIDAR 17 installed in the vehicle 1, creates the virtual plane 30A of the road surface 30 based on a recognition result thereof, and estimates the axial deviation amount of the LIDAR 17 mounted on the vehicle 1 based on the inclination of the virtual plane 30A with respect to the reference plane 17A of the LIDAR 17.

Accordingly, even when left and right white lines of the road surface 30 cannot be detected, the white lines of the road surface 30 are not straight, or the vehicle 1 does not travel straight, as long as the portion of the road surface 30 where the vehicle 1 is positioned and the portion of the road surface 30 where the virtual plane 30A is created are parallel to each other, it is possible to accurately estimate the axial deviation of the LIDAR 17.

The points (for example, the points 31 to 33) having a reflection intensity equal to or larger than a predetermined value are detected as the points on the road surface 30 for creating the virtual plane 30A, so that it is possible to improve detection accuracy of the points on the road surface 30, for example, even at points far from the vehicle 1. Therefore, it is possible to accurately estimate the axial deviation of the LIDAR 17.

<Continuous Detection of Points on Road Surface Performed by Axial Deviation Estimation Unit 55>

Figure 10:
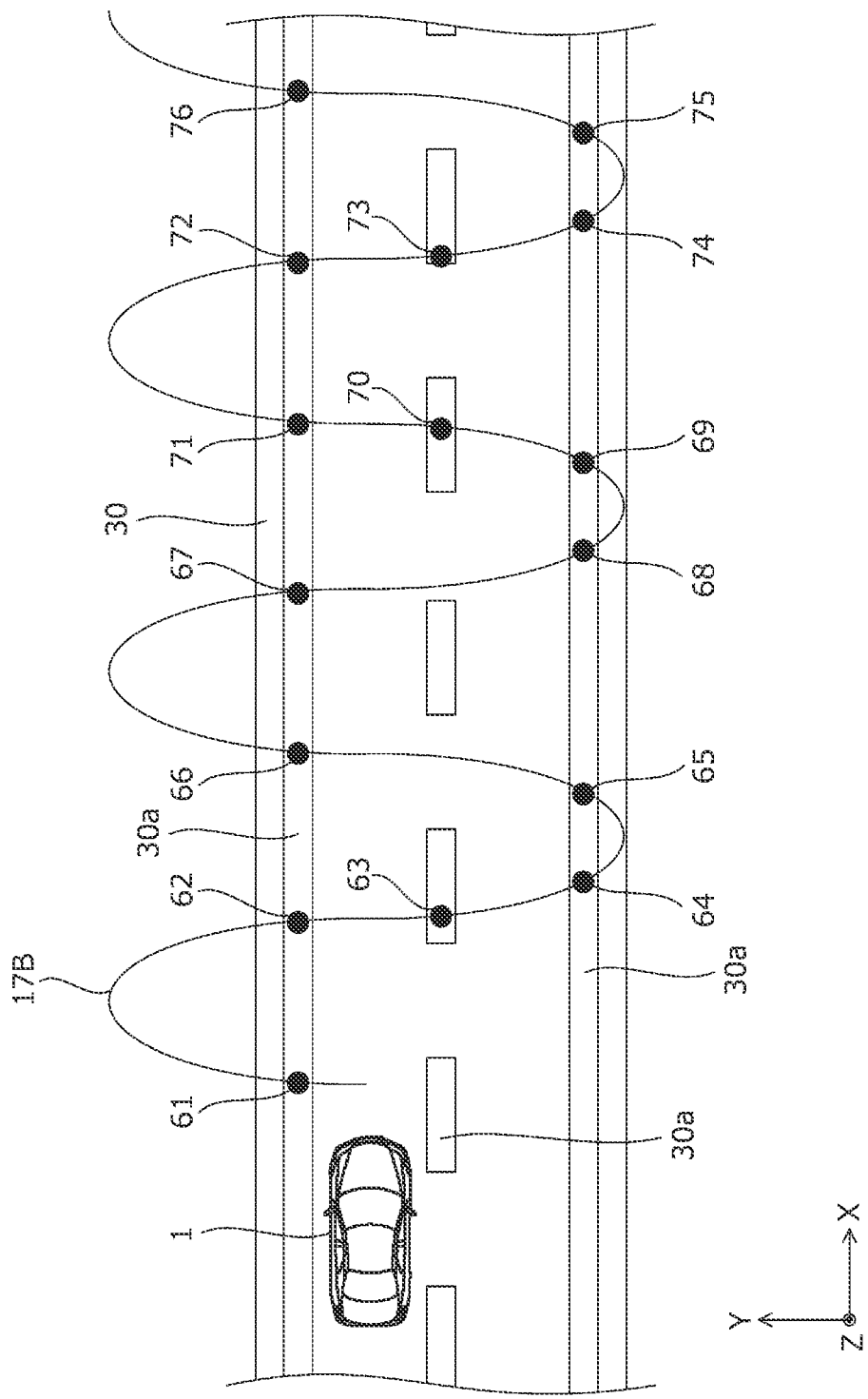
FIG. 10 is a diagram showing an example of continuous detection of points on the road surface performed by the axial deviation estimation unit 55.

FIG. 10 is a diagram showing an example of continuous detection of points on the road surface performed by the axial deviation estimation unit 55. A scanning trajectory 17B shown in FIG. 10 is a trajectory of scanning by the LIDAR 17. As described above, the plane creation unit 51 detects the three or more points at which the reflection intensity is equal to or larger than the predetermined value among the points of the road surface 30. Therefore, points on the road signs 30a such as the white lines on the road surface 30 are detected. In the example of FIG. 10, points 61 to 76 are detected.

When four or more points on the road surface 30 can be detected, the plane creation unit 51 can create a plurality of virtual planes of the road surface 30. For example, the plane creation unit 51 can create a virtual plane including the points 61 to 63, a virtual plane including the points 64 to 66, a virtual plane including the points 67 to 69, and the like. Alternatively, the plane creation unit 51 may create the virtual plane including the points 61 to 63, a virtual plane including the points 62 to 64, a virtual plane including the points 63 to 65, and the like by overlapping the points between the virtual planes.

In such a case, the estimation unit 52 estimates the axial deviation amount based on, for example, a virtual plane closest to the vehicle 1. In the example shown in FIG. 10, the LIDAR 17 estimates the axial deviation amount based on the virtual plane including the points 61 to 63. Accordingly, the virtual plane can be created in a state where an angle difference between the portion of the road surface 30 where the vehicle 1 is positioned and the portion of the road surface 30 where the virtual plane is created is more unlikely to occur. Therefore, it is possible to accurately estimate the axial deviation of the LIDAR 17.

Alternatively, the plane creation unit 51 may create the plurality of virtual planes of the road surface 30 as described above, and the estimation unit 52 may calculate an average of axial deviation amounts estimated from the plurality of virtual planes as the axial deviation amount of the LIDAR 17. Accordingly, even when the road surface 30 has unevenness, or even when a distance measurement result of the LIDAR 17 varies due to vibration of the vehicle 1 or accuracy of the LIDAR 17, it is possible to accurately estimate the axial deviation of the LIDAR 17.

The average of the axial deviation amounts may be a weighted average in which a higher weight is set for an axial deviation amount estimated from the virtual plane closer to the vehicle 1. Accordingly, it is possible to estimate the axial deviation amount by attaching importance to a virtual plane in which an angle difference with the portion of the road surface 30 where the vehicle 1 is positioned is unlikely to occur, and to accurately estimate the axial deviation of the LIDAR 17, while preventing an influence due to the unevenness of the road surface 30 or the variation in the distance measurement result of the LIDAR 17.

<Update of Axial Deviation Amount Performed by Axial Deviation Estimation Unit 55>

Figure 11:
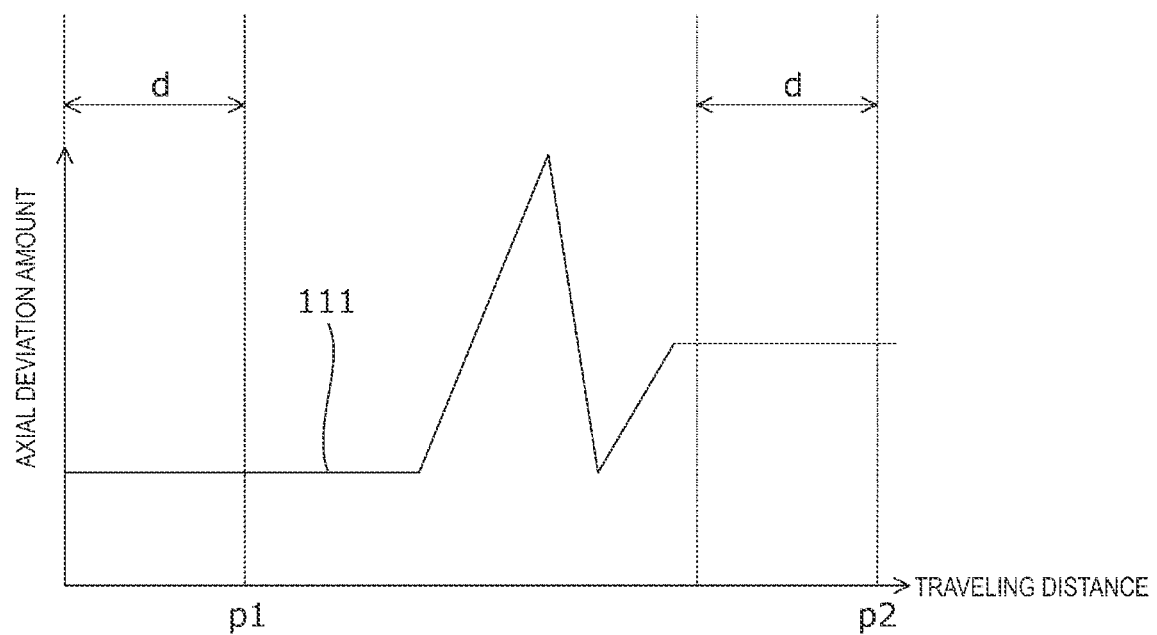
FIG. 11 is a diagram showing an example of an update of an axial deviation amount performed by the axial deviation estimation unit 55.

FIG. 11 is a diagram showing an example of an update of an axial deviation amount performed by the axial deviation estimation unit 55. In FIG. 11, a horizontal axis represents a traveling distance of the vehicle 1, and a vertical axis represents an axial deviation amount (for example, the axial deviation amount $\theta_{Roll}$ or the axial deviation amount $\theta_{Pitch}$) estimated by the estimation unit 52 based on the inclination of the virtual plane 30A with respect to the reference plane 17A.

The axial deviation estimation unit 55 continuously and repeatedly executes, for example, the processing shown in FIG. 3 while the vehicle 1 travels. An axial deviation amount transition 111 is a change in the axial deviation amount estimated by the estimation unit 52 of the axial deviation estimation unit 55 based on the virtual plane 30A in accordance with a traveling distance of the vehicle 1.

The estimation unit 52 updates an estimation result of the axial deviation amount when a predetermined condition is satisfied based on the axial deviation amount transition 111. The update of the estimation result of the axial deviation amount is to reflect a new estimation result of the axial deviation amount in a processing using the estimation result of the axial deviation amount by the estimation unit 52. The processing using the estimation result of the axial deviation amount by the estimation unit 52 is, for example, a processing of restricting a processing executable by the action planning unit 43 when the axial deviation amount is large. Specifically, when a predetermined condition is satisfied, the estimation unit 52 determines whether an axial deviation amount when the predetermined condition is satisfied is equal to or larger than a threshold, and outputs a restriction signal to the action planning unit 43 when the axial deviation amount is equal to or larger than the threshold.

The predetermined condition is that a variation amount of the axial deviation amount based on the inclination of the virtual plane 30A with respect to the reference plane 17A during traveling of the vehicle 1 by a predetermined distance d or more is equal to or smaller than a threshold. The variation amount of the axial deviation amount is, for example, a magnitude of a difference between a minimum value of the axial deviation amount and a maximum value of the axial deviation amount (variation range of the axial deviation amount).

In the example of FIG. 11, the estimation unit 52 updates the estimation result of the axial deviation amount since a distance traveled by the vehicle 1 in a state where the variation amount of the axial deviation amount is substantially zero reaches the predetermined distance d at a time point of a traveling distance p1. Specifically, at the time point of the traveling distance p1, the estimation unit 52 determines whether an axial deviation amount estimated at the time point is equal to or larger than a threshold, and outputs the restriction signal to the action planning unit 43 when the axial deviation amount is equal to or larger than the threshold.

At a time point of a traveling distance p2 (>p1), the estimation unit 52 updates the estimation result of the axial deviation amount since the distance traveled by the vehicle 1 in a state where the variation amount of the axial deviation amount is substantially zero reaches the predetermined distance d. Specifically, at the time point of the traveling distance p2, the estimation unit 52 determines whether an axial deviation amount estimated at the time point is equal to or larger than a threshold, and outputs the restriction signal to the action planning unit 43 when the axial deviation amount is equal to or larger than the threshold.

The estimation unit 52 does not update the estimation result of the axial deviation amount during a period between the time point of the traveling distance p1 and the time point of the traveling distance p2. That is, the estimation unit 52 does not output the restriction signal to the action planning unit 43 even when the axial deviation amount estimated during the period is equal to or larger than the threshold. Accordingly, even when the portion of the road surface 30 where the vehicle 1 is positioned and the portion of the road surface 30 where the virtual plane is created are temporarily not parallel to each other due to a change in the inclination of the road surface 30 on which the vehicle 1 is traveling, the processing executable by the action planning unit 43 cannot be restricted.

<Update Processing of Axial Deviation Amount Performed by Axial Deviation Estimation Unit 55>

Figure 12:
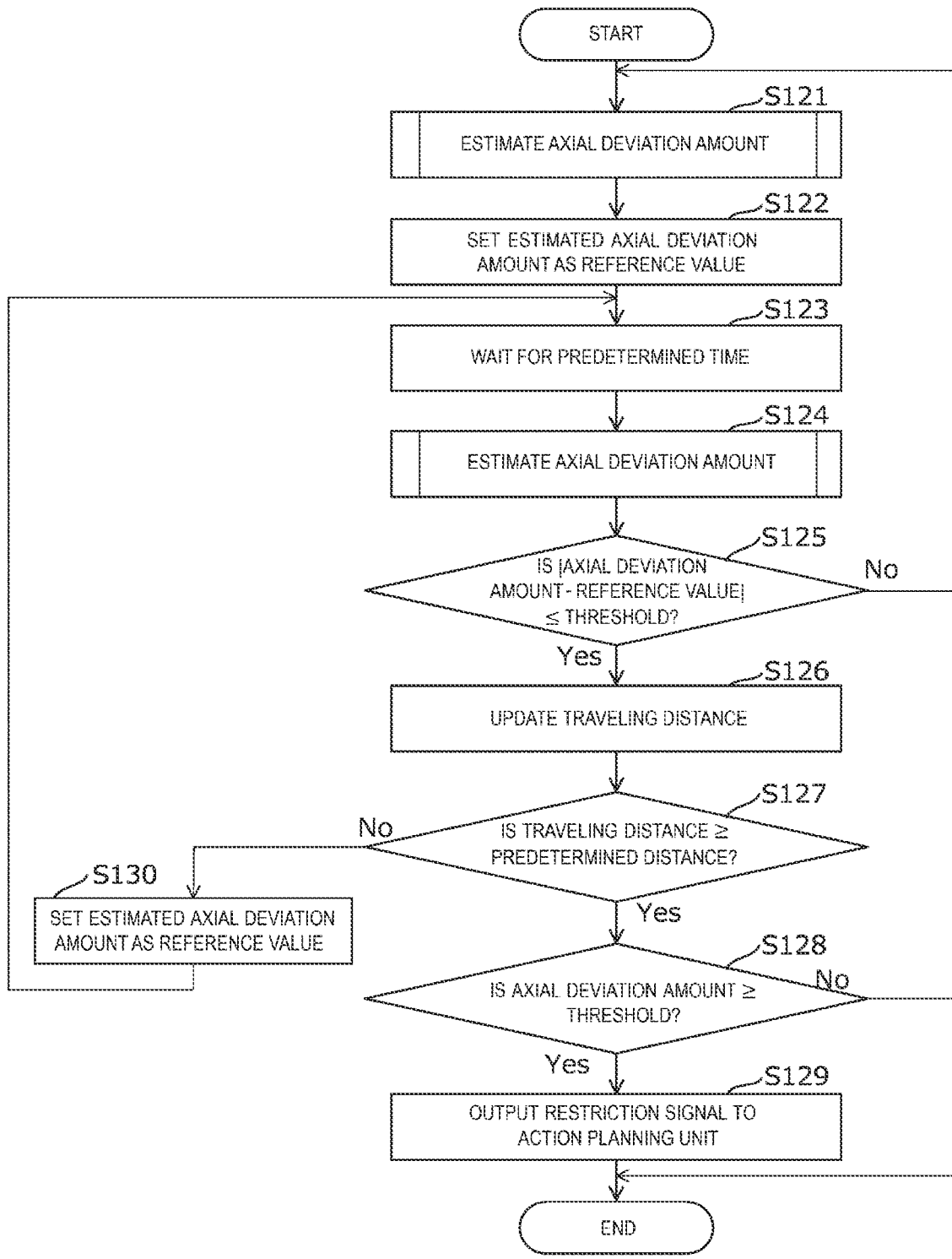
FIG. 12 is a flowchart showing an example of an update processing of an axial deviation amount performed by the axial deviation estimation unit 55.

FIG. 12 is a flowchart showing an example of an update processing of an axial deviation amount performed by the axial deviation estimation unit 55. The axial deviation estimation unit 55 executes, for example, the processing shown in FIG. 12.

First, the axial deviation estimation unit 55 estimates the axial deviation amount of the LIDAR 17 (step S121). The estimation of the axial deviation amount in step S121 is performed by, for example, the processing shown in FIG. 3. Next, the axial deviation estimation unit 55 sets the axial deviation amount estimated in step S121 as a reference value (step S122).

Next, the axial deviation estimation unit 55 waits for a predetermined time (step S123). Next, the axial deviation estimation unit 55 estimates the axial deviation amount of the LIDAR 17 again (step S124). The estimation of the axial deviation amount in step S124 is performed by, for example, the processing shown in FIG. 3.

Next, the axial deviation estimation unit 55 determines whether a magnitude of a difference between the axial deviation amount estimated in step S124 and the currently set reference value as the variation amount of the axial deviation amount of the LIDAR 17 is equal to or smaller than a threshold (step S125). As an example, the threshold can be a value of about 0.02°. When the magnitude of the difference between the estimated axial deviation amount and the reference value is not equal to or smaller than the threshold (step S125: No), since the variation amount of the axial deviation amount of the LIDAR 17 is large, the processing returns to step S121.

In step S125, when the magnitude of the difference between the estimated axial deviation amount and the reference value is equal to or smaller than the threshold (step S125: Yes), since the variation amount of the axial deviation amount of the LIDAR 17 is small, the axial deviation estimation unit 55 updates the traveling distance by a distance traveled during the waiting in step S123 (step S126). The traveling distance referred to here is a distance over which the vehicle 1 continuously travels in a state where the variation amount of the axial deviation amount is small, and is set to 0 at the start of the processing of FIG. 12, In step S126, the axial deviation estimation unit 55 updates the traveling distance by performing a processing of adding the distance traveled during the waiting in step S123 to a current traveling distance.

Next, the axial deviation estimation unit 55 determines whether the traveling distance updated in step S126 is equal to or larger than a predetermined distance (predetermined distance d) (step S127). When the updated traveling distance is equal to or larger than the predetermined distance (step S127: Yes), it is a situation in which the vehicle 1 travels the predetermined distance or more in a state where the variation amount of the axial deviation amount is small. In this case, the axial deviation estimation unit 55 determines whether the axial deviation amount is equal to or larger than a threshold based on an estimation result of the estimated current axial deviation amount (step S128). The threshold is a value of the axial deviation amount that is a reference of whether to restrict the processing executable by the action planning unit 43 based on the estimation result of the axial deviation amount by the axial deviation estimation unit 55.

In step S128, when the axial deviation amount is not equal to or larger than the threshold (step S128: No), the axial deviation estimation unit 55 ends the series of processings. When the axial deviation amount is equal to or larger than the threshold (step S128: Yes), the axial deviation estimation unit 55 outputs, to the action planning unit 43, a restriction signal indicating that there is an axial deviation to an extent that the processing executable by the action planning unit 43 should be restricted (step S129), and ends the series of processings.

In step S127, when the updated traveling distance is not equal to or larger than the predetermined distance (step S127: No), the axial deviation estimation unit 55 sets the axial deviation amount estimated in step S124 as a new reference value (step S130), and returns to step S123.

As described with reference to FIGS. 11 and 12, the axial deviation estimation unit 55 updates the estimation result of the axial deviation amount when the predetermined condition is satisfied. The predetermined condition is that the variation amount of the axial deviation amount based on the inclination of the virtual plane 30A with respect to the reference plane 17A of the LIDAR 17 is equal to or smaller than the threshold when the vehicle 1 travels the predetermined distance or more.

A case where the vehicle 1 travels the predetermined distance or more in a state where the variation amount of the axial deviation amount is equal to or smaller than the threshold means that an inclination of a portion of the road surface 30 where the vehicle 1 travels or a portion of the road surface 30 where the virtual plane is created is substantially constant during that period. Therefore, when updating the estimation result of the axial deviation amount in this case, the estimation result of the axial deviation amount is not updated in a state where the portion of the road surface 30 where the vehicle 1 is positioned and the portion of the road surface 30 where the virtual plane is created are not parallel to each other, and it is possible to accurately estimate the axial deviation of the LIDAR 17. Further, it is possible to prevent a temporary variation of the axial deviation amount caused by a state, vibration, or the like of the road surface 30 from influencing the processing based on the estimation result of the axial deviation amount.

As the processing based on the estimation result of the axial deviation amount, the processing of restricting the processing executable by the action planning unit 43 when the axial deviation amount is equal to or larger than the threshold has been described, but the processing is not limited thereto. For example, the processing based on the estimation result of the axial deviation amount may be correction of the distance measurement data obtained by the LIDAR 17. For example, the external environment recognition unit 41 may correct the distance measurement data obtained by the LIDAR 17 based on the axial deviation amount estimated by the axial deviation estimation unit 55, and may execute an external environment recognition processing based on the corrected distance measurement data.

<Estimation of Axial Deviation Amount Based on a Plurality of Virtual Planes Performed by Axial Deviation Estimation Unit 55>

FIG. 13 is a diagram showing an example of estimation of an axial deviation amount based on a plurality of virtual planes performed by the axial deviation estimation unit 55.

At a certain time t0, the plane creation unit 51 creates the virtual plane 30A including the points 31 to 33 in front of the vehicle 1 on the road surface 30 and a virtual plane 30B including the points 34 to 36 further in front of the vehicle 1 on the road surface 30.

Next, at time t0+t1 when the vehicle 1 has advanced to a portion of the road surface 30 corresponding to the virtual plane 30A, the plane creation unit 51 creates a virtual plane 30C including the points 37 to 39 of a portion of the road surface 30 corresponding to the virtual plane 30B. That is, the virtual plane 30C is obtained by creating a virtual plane of the same portion of the road surface 30 as the virtual plane 30B based on distance measurement data from a position where the virtual plane 30B is created. The points 37 to 39 may be the same three points as the points 34 to 36, or may be three points different from the points 34 to 36.

<Virtual Planes 30A to 30C when There is No Axial Deviation of LIDAR 17>

Figure 14:
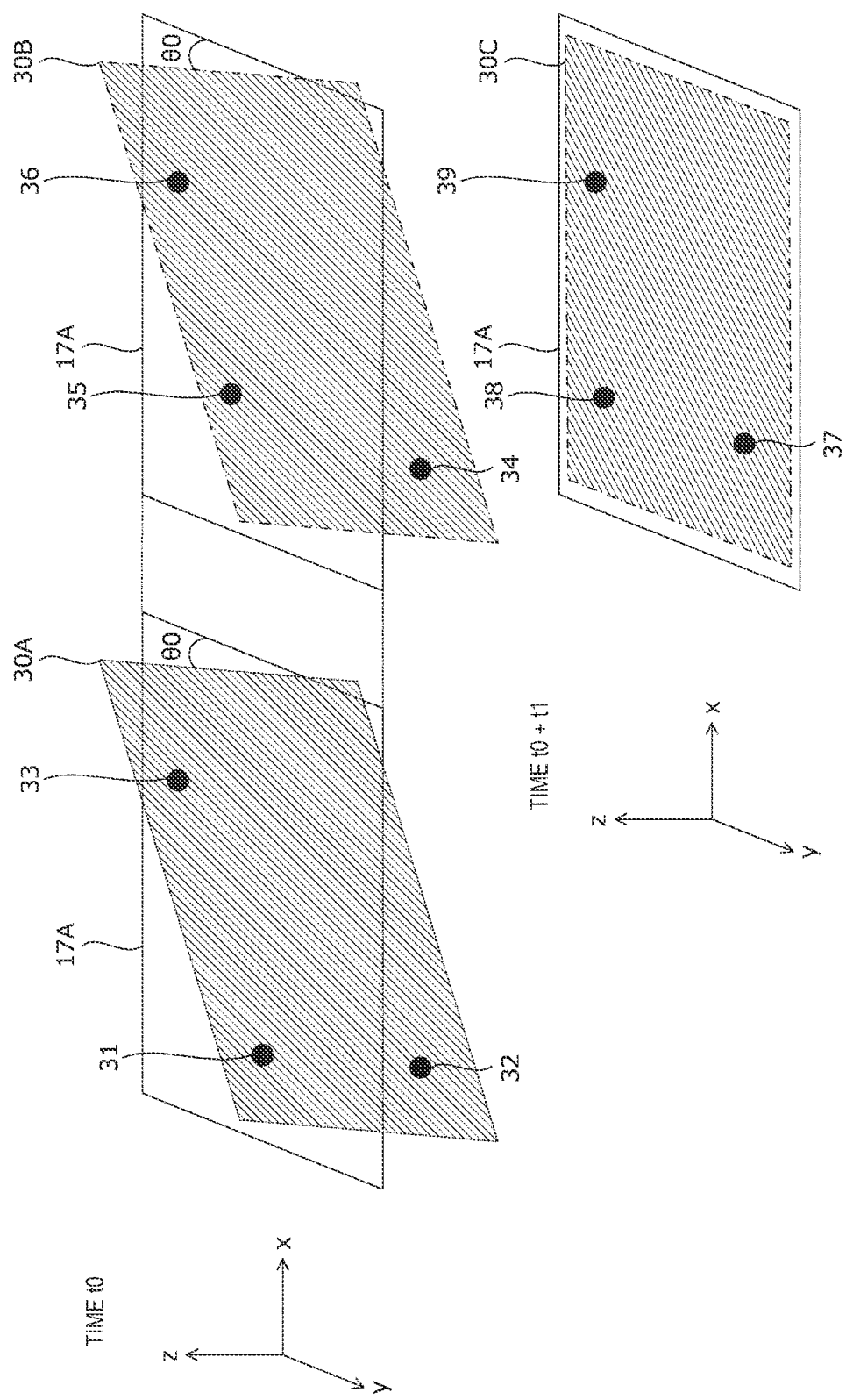
FIG. 14 is a diagram showing an example of virtual planes 30A to 30C when there is no axial deviation of the LIDAR 17.

FIG. 14 is a diagram showing an example of the virtual planes 30A to 30C when there is no axial deviation of the LIDAR 17. When there is no axial deviation of the LIDAR 17, the virtual planes 30A to 30C shown in FIG. 13 are, for example, those shown in FIG. 14.

An inclination of the virtual plane 30A created at the time t0 with respect to the reference plane 17A and an inclination of the virtual plane 30B created at the time t0 with respect to the reference plane 17A are both θ0. This means that the portion of the road surface 30 corresponding to the virtual plane 30A and the portion of the road surface 30 corresponding to the virtual plane 30B are parallel to each other regardless of presence or absence of the axial deviation of the LIDAR 17.

However, with only the virtual planes 30A and 30B, it is not possible to determine whether an axial deviation occurs in the LIDAR 17, whether a portion of the road surface 30 where the vehicle 1 is positioned at the time t0 and portions of the road surface 30 corresponding to the virtual planes 30A and 30B are not parallel to each other, or whether the axial deviation and the portions being unparallel are generated in a combined manner.

In the example shown in FIG. 14, an inclination of the virtual plane 30C created at the time t0+t1 with respect to the reference plane 17A is 0. This means that an inclination of the portion of the road surface 30 corresponding to the virtual plane 30B (virtual plane 30C) can be correctly detected based on distance measurement from the portion of the road surface 30 corresponding to the virtual plane 30A.

That is, in this case, it can be determined that there is an angle θ0 between the portion of the road surface 30 where the vehicle 1 is positioned at the time t0 and the portions of the road surface 30 corresponding to the virtual planes 30A and 30B, and that no axial deviation occurs in the LIDAR 17.

<Virtual Planes 30A to 30C when there is Axial Deviation of LIDAR 17>

Figure 15:
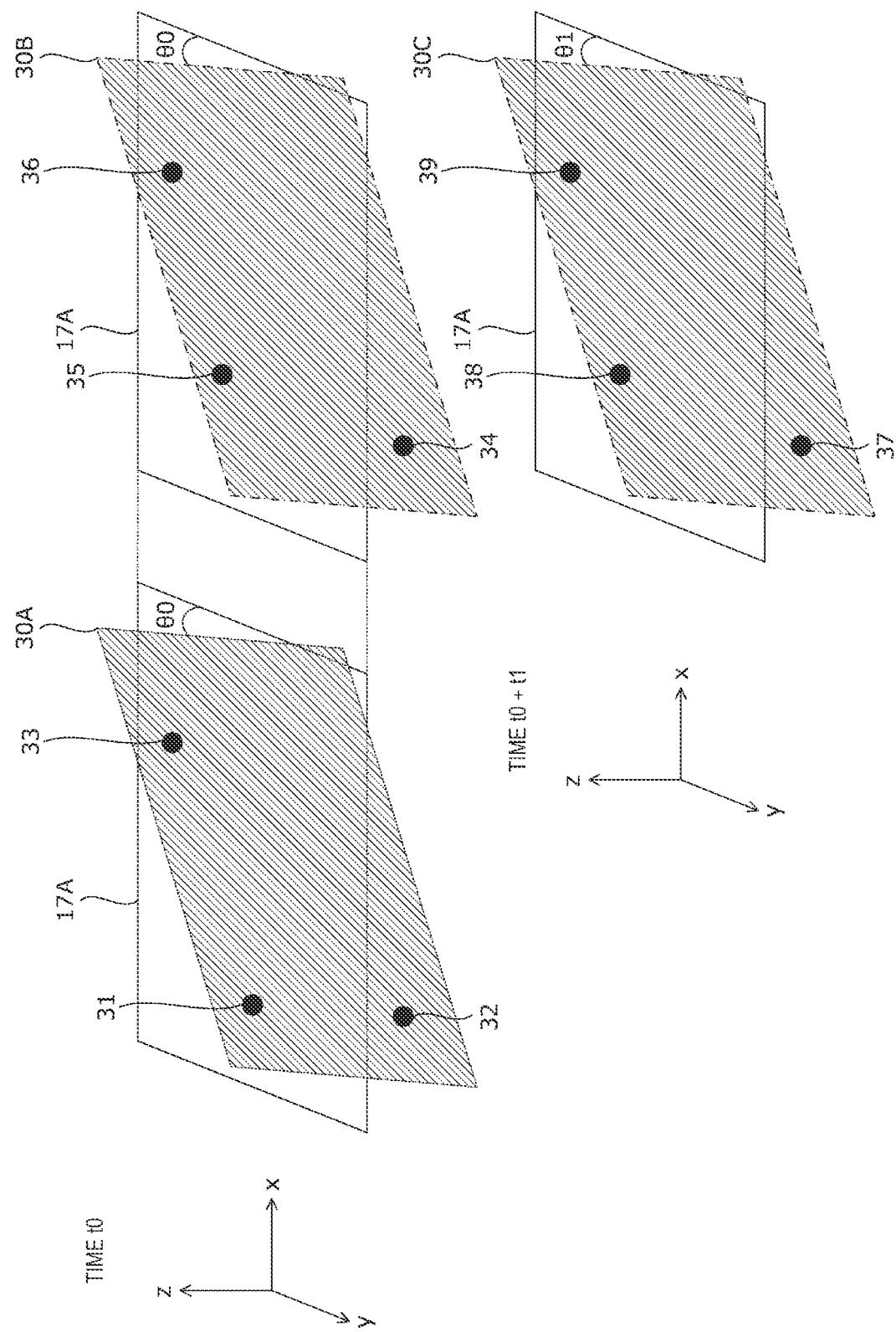
FIG. 15 is a diagram showing an example of the virtual planes 30A to 30C when there is the axial deviation of the LIDAR 17.

FIG. 15 is a diagram showing an example of the virtual planes 30A to 30C when there is the axial deviation of the LIDAR 17. When there is the axial deviation of the LIDAR 17, the virtual planes 30A and 30B shown in FIG. 13 are, for example, those shown in FIG. 15.

In the example shown in FIG. 15, an inclination of the virtual plane 30C created at the time t0+t1 with respect to the reference plane 17A is θ1. This means that detection of the inclination of the portion of the road surface 30 corresponding to the virtual plane 30B (virtual plane 30C) deviates by θ1 based on distance measurement from the portion of the road surface 30 corresponding to the virtual plane 30A.

That is, in this case, it can be determined that there is an angle θ1 between the portion of the road surface 30 where the vehicle 1 is positioned at the time t0 and the portions of the road surface 30 corresponding to the virtual planes 30A and 30B, and that the axial deviation of θ1 occurs in the LIDAR 17. In this case, the angle between the portion of the road surface 30 where the vehicle 1 is positioned at the time t0 and the portions of the road surface 30 corresponding to the virtual planes 30A and 30B is θ0 to θ1.

<Estimation Processing of Axial Deviation Based on Virtual Planes 30A to 30C Performed by Axial Deviation Estimation Unit 55>

Figure 16:
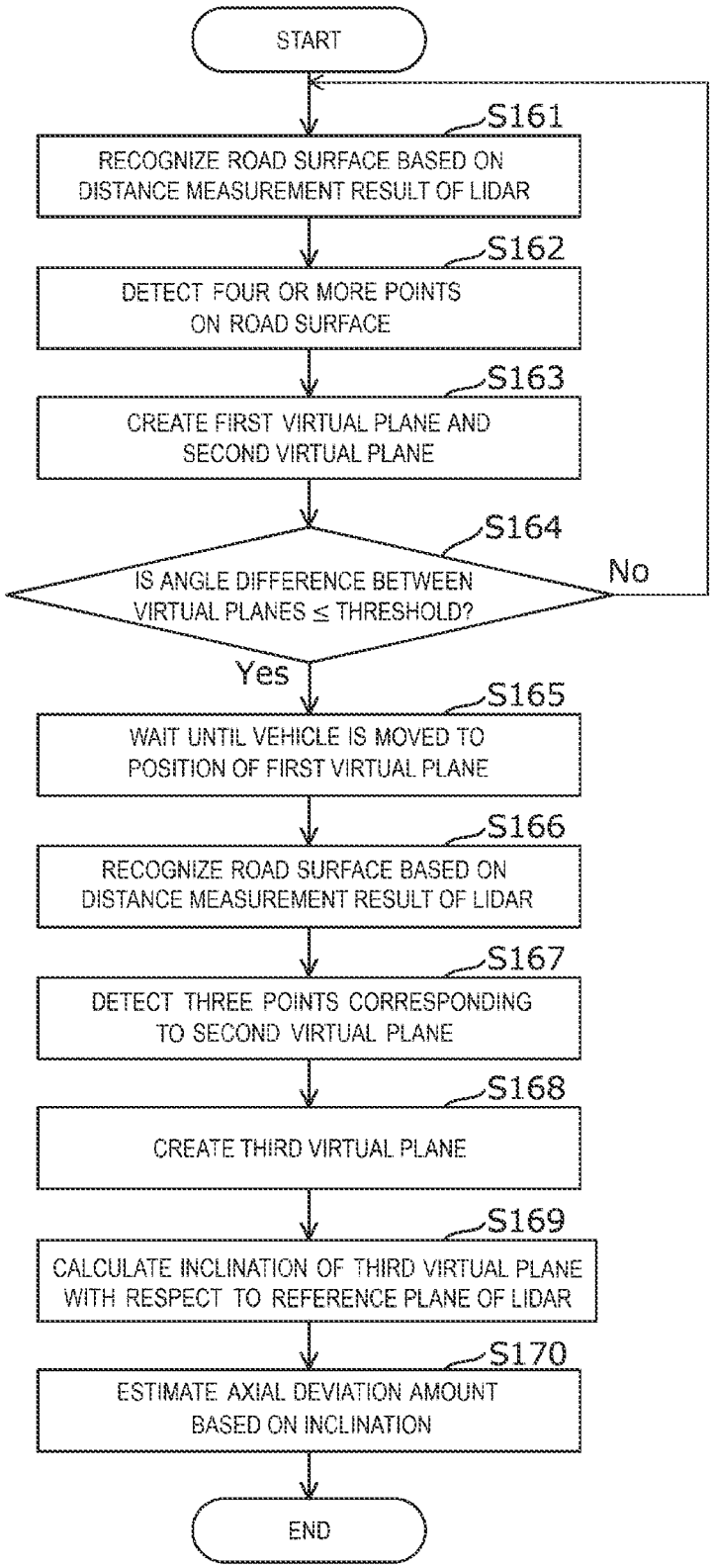
FIG. 16 is a flowchart showing an example of an estimation processing of an axial deviation amount based on the plurality of virtual planes performed by the axial deviation estimation unit 55.

FIG. 16 is a flowchart, showing an example of an estimation processing of an axial deviation amount based on the plurality of virtual planes performed by the axial deviation estimation unit 55. The axial deviation estimation unit 55 may execute the processing shown in FIG. 16 instead of the processing shown in FIG. 3.

Steps S161 and S162 shown in FIG. 16 are the same as steps S31 and S32 shown in FIG. 3. However, in step S162, the axial deviation estimation unit 55 detects four or more points on the road surface 30 such that two virtual planes can be created. In the example of FIG. 13, the six points 31 to 36 on the road surface 30 are detected.

Next, the axial deviation estimation unit 55 creates a first virtual plane and a second virtual plane based on the plurality of points detected in step S162 (step S163). The first virtual plane is a virtual plane of a portion of the road surface 30 in front of the vehicle 1, and is, for example, the virtual plane 30A in the example of FIG. 13. The second virtual plane is a virtual plane of a portion of the road surface 30 in front of the first virtual plane as viewed from the vehicle 1, and is, for example, the virtual plane 30B in the example of FIG. 13.

Next, the axial deviation estimation unit 55 determines whether an angle difference between the first virtual plane and the second virtual plane (virtual planes) created in step S163 is equal to or smaller than a threshold (step S164). The threshold is an angle between two virtual planes that can be regarded as substantially parallel. When the angle difference between the virtual planes is not equal to or smaller than the threshold (step S164: No), the axial deviation estimation unit 55 returns to step S161.

In step S164, when the angle difference between the virtual planes is equal to or smaller than the threshold (step S164: Yes), the axial deviation estimation unit 55 waits until the vehicle 1 is moved to a position of the road surface 30 corresponding to the first virtual plane (step S165).

Next, the axial deviation estimation unit 55 recognizes the road surface 30 based on a distance measurement result of the LIDAR 17 (step S166). Next, the axial deviation estimation unit 55 detects three points of a portion of the road surface 30 recognized in step S166 corresponding to the second virtual plane (step S167). Next, the axial deviation estimation unit 55 creates a third virtual plane including the three points detected in step S167 (step S168). The third virtual plane is a virtual plane of a portion of the road surface 30 corresponding to the second virtual plane, and is the virtual plane 30C in the example of FIG. 13.

Next, the axial deviation estimation unit 55 calculates an inclination of the third virtual plane created in step S168 with respect to the reference plane of the LIDAR 17 (step S169). Next, the axial deviation estimation unit 55 estimates the axial deviation amount of the LIDAR 17 based on the inclination calculated in step S169 (step S170), and ends the series of processings.

As shown in FIGS. 13 to 16, the axial deviation estimation unit 55 creates, based on the recognition result of the road surface 30 at a certain timing (for example, time t0), the first virtual plane (for example, the virtual plane 30A) of the road surface 30 and the second virtual plane (for example, the virtual plane 30B) of the road surface 30 that is farther from the vehicle 1 than the first virtual plane and that has the angle difference with the first virtual plane equal to or smaller than the threshold. Then, the axial deviation estimation unit 55 estimates the axial deviation amount based on the third virtual plane (for example, the virtual plane 30C) created at the timing (for example, the time t0+t1) at which the vehicle 1 is present on the portion of the road surface 30 corresponding to the first virtual plane.

That is, the axial deviation estimation unit 55 detects the first region and the second region (the portions corresponding to the virtual planes 30A and 30B) parallel to each other of the road surface 30 based on the recognition result of the road surface 30, and estimates the axial deviation amount based on the virtual plane of the second region recognized from the first region when the vehicle 1 is moved to the first region. Accordingly, since the portion of the road surface 30 where the vehicle 1 is positioned and the portion of the road surface 30 where the virtual plane is created are parallel to each other, it is possible to accurately estimate the axial deviation of the LIDAR 17.

The processing of determining whether the angle difference between the first virtual plane and the second virtual plane is equal to or smaller than the threshold has been described in step S164, but the axial deviation estimation unit 55 may perform a processing of determining whether a ratio of the angle difference between the first virtual plane and the second virtual plane to an angle with respect to the reference plane 17A is equal to or smaller than a threshold in step S164. The angle with respect to the reference plane 17A may be, for example, an angle of the first virtual plane (virtual plane 30A) with respect to the reference plane 17A, an angle of the second virtual plane (virtual plane 30B) with respect to the reference plane 17A, or an average of the angle of the first virtual plane (virtual plane 30A) with respect to the reference plane 17A and the angle of the second virtual plane (virtual plane 30B) with respect to the reference plane 17A.

Although the embodiment of the present invention has been described above, the present invention is not limited to the above-described embodiment, and modifications, improvements, and the like can be made as appropriate.

For example, the case where the axial deviation of the LIDAR 17 is estimated using the recognition result of the LIDAR 17 has been described, but an axial deviation of another in-vehicle sensor mounted on the vehicle 1 may be estimated using the recognition result of the LIDAR 17. For example, when the same axial deviation as that of the LIDAR 17 occurs in the outside-vehicle camera 16 due to, for example, the outside-vehicle camera 16 being attached to the same portion as that of the LIDAR 17, the estimation unit 52 may estimate the above-described axial deviation amounts $\theta_{Roll}$ and $\theta_{Pitch}$ as axial deviation amounts of the outside-vehicle camera 16.

The configuration in which the three points (for example, the points 31 to 33) on the road surface 30 are detected and the virtual plane 30A including the three points is created has been described, but a configuration in which four or more points on the road surface 30 are detected and the virtual plane 30A based on the four or more points is created may be adopted. The creation of the virtual plane 30A based on the four or more points can be performed by robust estimation such as RANSAC (Random Sample Consensus).

The configuration in which the processing serving as the axial deviation estimation apparatus of the present invention is executed by the processor of the control apparatus 10 has been described, but the processing serving as the axial deviation estimation apparatus of the present invention may be executed by a processor of the in-vehicle sensor (the LIDAR 17 or the outside-vehicle camera 16) that is an estimation target of the axial deviation.

At least the following matters are described in the present specification. The corresponding components or the like in the above-described embodiment are shown in parentheses, but the present invention is not limited thereto.

(1) An axial deviation estimation apparatus (the axial deviation estimation unit 55) of an in-vehicle sensor, the axial deviation estimation apparatus including:

a road surface recognition unit (the road surface recognition unit 50) configured to recognize a road surface (the road surface 30) by a laser radar (the LIDAR 17) installed in a vehicle (the vehicle 1);

an estimation unit (the estimation unit 52) configured to estimate an axial deviation amount of the in-vehicle sensor (the LIDAR 17, the outside-vehicle camera 16) mounted on the vehicle; and a plane creation unit (the plane creation unit 51) configured to create a virtual plane (the virtual plane 30A) of the road surface based on a recognition result of the road surface recognition unit, in which the estimation unit estimates the axial deviation amount based on an inclination of the virtual plane with respect to a reference plane of the laser radar.

According to (1), even when the left and right white lines of the road surface cannot be detected, the white lines of the road surface are not straight, or the vehicle does not travel straight, as long as the portion of the road surface where the vehicle is positioned and the portion of the road surface 30 where the virtual plane is created are parallel to each other, it is possible to accurately estimate the axial deviation of the in-vehicle sensor.

(2) The axial deviation estimation apparatus according to (1), in which the plane creation unit detects three or more points (the points 31 to 39 and 61 to 76) on the road surface and creates the virtual plane based on the three or more points.

According to (2), it is possible to create the virtual plane parallel to the road surface.

(3) The axial deviation estimation apparatus according to (2), in which the three or more points are points at which a reflection intensity on the road surface is equal to or larger than a predetermined value.

According to (3), it is possible to improve detection accuracy of the points on the road surface.

(4) The axial deviation estimation apparatus according to any one of (1) to (3), in which the estimation unit estimates the axial deviation amount based on the virtual plane closest to the vehicle when a plurality of the virtual planes are created by the plane creation unit.

According to (4), it is possible to create the virtual plane in a state where the angle difference between the portion of the road surface where the vehicle is positioned and the portion of the road surface where the virtual plane is created is more unlikely to occur. Therefore, it is possible to accurately estimate the axial deviation of the in-vehicle sensor.

(5) The axial deviation estimation apparatus according to any one of (1) to (3), in which the estimation unit calculates an average of the axial deviation amounts estimated from the virtual planes when a plurality of the virtual planes are created by the plane creation unit.

According to (5), even when there is unevenness on the road surface or there is variation in a distance measurement result of the laser radar due to vibration of the vehicle or accuracy of the laser radar, it is possible to accurately estimate the axial deviation of the in-vehicle sensor.

(6) The axial deviation estimation apparatus according to (5), in which the average is a weighted average in which a higher weight is set for the axial deviation amount estimated from the virtual plane closer to the vehicle.

According to (6), it is possible to estimate the axial deviation amount of the in-vehicle sensor by attaching importance to a virtual plane on which an angle difference with the portion of the road surface where the vehicle is positioned is unlikely to occur, and to accurately estimate the axial deviation of the in-vehicle sensor, while preventing an influence due to the unevenness of the road surface or the variation in the distance measurement result of the laser radar.

(7) The axial deviation estimation apparatus according to any one of (1) to (6), in which the estimation unit updates an estimation result of the axial deviation amount when a predetermined condition is satisfied, and in which the predetermined condition is that a variation amount of the axial deviation amount based on the inclination is equal to or smaller than a threshold when the vehicle travels a predetermined distance or more.

According to (7), since the estimation result of the axial deviation amount can be updated when the inclination of the portion of the road surface where the vehicle travels or the portion of the road surface where the virtual plane is created is substantially constant, the estimation result of the axial deviation amount is not updated in a state where the portion of the road surface where the vehicle is positioned and the portion of the road surface where the virtual plane is created are not parallel to each other, and it is possible to accurately estimate the axial deviation of the in-vehicle sensor.

(8) The axial deviation estimation apparatus according to any one of (1) to (3), in which the plane creation unit creates, based on the recognition result at a certain timing, a first virtual plane (the virtual plane 30A) of the road surface and a second virtual plane (the virtual plane 30B) of a portion of the road surface farther from the vehicle than the first virtual plane, the second virtual plane having an angle difference with the first virtual plane equal to or smaller than a threshold, and in which the estimation unit estimates the axial deviation amount based on a third virtual plane (the virtual plane 30C) created at a timing at which the vehicle is present on a portion of the road surface corresponding to the first virtual plane.

According to (8), since the portion of the road surface where the vehicle is positioned and the portion of the road surface where the third virtual plane is created are parallel to each other, it is possible to accurately estimate the axial deviation of the in-vehicle sensor.

(9) The axial deviation estimation apparatus according to (8), in which the third virtual plane is a virtual plane of a portion of the road surface corresponding to the second virtual plane.

(10) The axial deviation estimation apparatus according to (8) or (9), in which the estimation unit estimates the axial deviation amount based on an inclination of the third virtual plane with respect to the reference plane.

What is claimed is:

1. An axial deviation estimation apparatus of an in-vehicle sensor, the axial deviation estimation apparatus comprising:
   a road surface recognition unit configured to recognize a road surface by a laser radar installed in a vehicle;
   an estimation unit configured to estimate an axial deviation amount of the in-vehicle sensor mounted on the vehicle; and
   a plane creation unit configured to create a virtual plane of the road surface based on a recognition result of the road surface recognition unit,
   wherein the estimation unit estimates the axial deviation amount based on an inclination of the virtual plane with respect to a reference plane of the laser radar,
   wherein the estimation unit updates an estimation result of the axial deviation amount when a predetermined condition is satisfied,
   wherein the predetermined condition is that a variation amount of the axial deviation amount based on the inclination is equal to or smaller than a threshold when the vehicle travels a predetermined distance or more, and
   wherein the road surface recognition unit, the estimation unit, and the plane creation unit are each implemented via at least one processor.

2. The axial deviation estimation apparatus according to claim 1,
   wherein the plane creation unit detects three or more points on the road surface and creates the virtual plane based on the three or more points.

3. The axial deviation estimation apparatus according to claim 2,
   wherein the three or more points are points at which a reflection intensity on the road surface is equal to or larger than a predetermined value.

4. The axial deviation estimation apparatus according to claim 1,
   wherein the estimation unit estimates the axial deviation amount based on the virtual plane closest to the vehicle when a plurality of the virtual planes are created by the plane creation unit.

5. The axial deviation estimation apparatus according to claim 1,
   wherein the estimation unit calculates an average of the axial deviation amounts estimated from the virtual planes when a plurality of the virtual planes are created by the plane creation unit.

6. The axial deviation estimation apparatus according to claim 5,
   wherein the average is a weighted average in which a higher weight is set for the axial deviation amount estimated from the virtual plane closer to the vehicle.

7. The axial deviation estimation apparatus according to claim 1,
   wherein the plane creation unit creates, based on the recognition result at a certain timing, a first virtual plane of the road surface and a second virtual plane of a portion of the road surface farther from the vehicle than the first virtual plane, the second virtual plane having an angle difference with the first virtual plane equal to or smaller than a threshold, and
   wherein the estimation unit estimates the axial deviation amount based on a third virtual plane created at a timing at which the vehicle is present on a portion of the road surface corresponding to the first virtual plane.

8. The axial deviation estimation apparatus according to claim 7,
   wherein the third virtual plane is a virtual plane of a portion of the road surface corresponding to the second virtual plane.

9. The axial deviation estimation apparatus according to claim 7,
   wherein the estimation unit estimates the axial deviation amount based on an inclination of the third virtual plane with respect to the reference plane.

10. An axial deviation estimation apparatus of an in-vehicle sensor, the axial deviation estimation apparatus comprising:
    a road surface recognition unit configured to recognize a road surface by a laser radar installed in a vehicle;
    an estimation unit configured to estimate an axial deviation amount of the in-vehicle sensor mounted on the vehicle; and
    a plane creation unit configured to create a virtual plane of the road surface based on a recognition result of the road surface recognition unit,
    wherein the estimation unit estimates the axial deviation amount based on an inclination of the virtual plane with respect to a reference plane of the laser radar,
    wherein the plane creation unit creates, based on the recognition result at a certain timing, a first virtual plane of the road surface and a second virtual plane of a portion of the road surface farther from the vehicle than the first virtual plane, the second virtual plane having an angle difference with the first virtual plane equal to or smaller than a threshold,
    wherein the estimation unit estimates the axial deviation amount based on a third virtual plane created at a timing at which the vehicle is present on a portion of the road surface corresponding to the first virtual plane, and
    wherein the road surface recognition unit, the estimation unit, and the plane creation unit are each implemented via at least one processor.

11. The axial deviation estimation apparatus according to claim 10,
  wherein the third virtual plane is a virtual plane of a portion of the road surface corresponding to the second virtual plane.

12. The axial deviation estimation apparatus according to claim 10,
  wherein the estimation unit estimates the axial deviation amount based on an inclination of the third virtual plane with respect to the reference plane.

* * * * *